US012632965B2

(12) United States Patent
Shriram et al.

(10) Patent No.: US 12,632,965 B2
(45) Date of Patent: May 19, 2026

(54) UNCERTAINTY ESTIMATION VIA OBJECT-SPECIFIC AND OBJECT-AGNOSTIC SEGMENTATION DISAGREEMENT

(71) Applicant: GE Precision Healthcare LLC, Waukesha, WI (US)

(72) Inventors: Krishna Seetharam Shriram, Bengaluru (IN); Vikram Reddy Melapudi, Bangalore (IN); Hariharan Ravishankar, Bengaluru (IN); Pavan Annangi, Bangalore (IN); Chandan Kumar Mallappa Aladahalli, Bengaluru (IN)

(73) Assignee: GE Precision Healthcare LLC, Waukesha, WI (US)

( * ) Notice: Subject to any disclaimer, the term of this patent is extended or adjusted under 35 U.S.C. 154(b) by 401 days.

(21) Appl. No.: 18/337,968

(22) Filed: Jun. 20, 2023

(65) Prior Publication Data

US 2024/0428421 A1     Dec. 26, 2024

(51) Int. Cl.
| | |
|---|---|
| *G06T 7/12* | (2017.01) |
| *G06T 7/00* | (2017.01) |
| *G06T 7/13* | (2017.01) |
| *G06V 10/25* | (2022.01) |

(52) U.S. Cl.
CPC .............. *G06T 7/12* (2017.01); *G06T 7/0012* (2013.01); *G06T 7/13* (2017.01); *G06V 10/25* (2022.01); *G06T 2207/10132* (2013.01)

(58) Field of Classification Search
CPC ........... G06T 7/12; G06T 7/0012; G06T 7/13; G06T 2207/10132; G06V 10/25
See application file for complete search history.

(56) References Cited

U.S. PATENT DOCUMENTS

| | | | | |
|---|---|---|---|---|
| 2017/0287137 | A1* | 10/2017 | Lin | ............................ G06T 7/11 |
| 2018/0108137 | A1* | 4/2018 | Price | ........................ G06N 3/08 |
| 2019/0333225 | A1* | 10/2019 | Wan | ..................... G06V 40/162 |

(Continued)

FOREIGN PATENT DOCUMENTS

WO     WO-2024068506 A1 *   4/2024   ........... G06T 7/0012

OTHER PUBLICATIONS

Gal, Y et al. | "Dropout as a bayesian approximation: Representing model uncertainty in deep learning." Proceedings of the 33 rd International Conference on Machine Learning, New York, NY, USA, 2016. JMLR: W&CP vol. 48, 10 pages.

(Continued)

*Primary Examiner* — Jennifer Mehmood
*Assistant Examiner* — Jose M Torres
(74) *Attorney, Agent, or Firm* — Amin, Turocy & Watson, LLP

(57) ABSTRACT

Systems/techniques that facilitate improved uncertainty estimation via object-specific and object-agnostic segmentation disagreement are provided. In various embodiments, a system can access an image depicting an object. In various aspects, the system can localize, via execution of an object-specific segmentation model on the image, a first inferred boundary of the object. In various instances, the system can generate an uncertainty score for the first inferred boundary, based on a second inferred boundary of the object generated via execution of an object-agnostic segmentation model on the image.

20 Claims, 19 Drawing Sheets

(56) References Cited

U.S. PATENT DOCUMENTS

| 2020/0167930 A1* | 5/2020 | Wang | G06T 7/11 |
|---|---|---|---|
| 2020/0219274 A1* | 7/2020 | Afridi | G06N 3/04 |
| 2021/0027098 A1* | 1/2021 | Ge | G06F 18/217 |
| 2021/0082118 A1* | 3/2021 | Zhang | G06N 3/0455 |
| 2021/0241016 A1* | 8/2021 | Hashimoto | G01T 1/161 |
| 2021/0279884 A1* | 9/2021 | El-Zehiry | G06T 7/0014 |
| 2022/0044407 A1* | 2/2022 | Liu | G06T 7/11 |
| 2022/0058809 A1* | 2/2022 | Fuchs | G06V 10/751 |
| 2022/0198671 A1* | 6/2022 | Price | G06N 3/045 |
| 2024/0078787 A1* | 3/2024 | Taghavi | G06V 10/762 |
| 2024/0212163 A1* | 6/2024 | Yang | G06T 11/008 |
| 2024/0386551 A1* | 11/2024 | Rajapakse | G06V 10/25 |

OTHER PUBLICATIONS

Wang, G. et al. | "Aleatoric uncertainty estimation with test-time augmentation for medical image segmentation with convolutional neural networks." Neurocomputing. Sep. 3, 2019; 335: 34-45. doi:10.1016/j.neucom.2019.01.103, 31 pages.

Lakshminarayanan, B. et al. | "Simple and scalable predictive uncertainty estimation using deep ensembles." Advances in neural information processing systems, 31st Conference on Neural Information Processing Systems (NIPS 2017), Long Beach, CA, USA, 12 pages.

* cited by examiner

300

IMAGE 104

OBJECT 106

OBJECT-SPECIFIC SEGMENTATION MODEL 110

INFERRED BOUNDARY 202

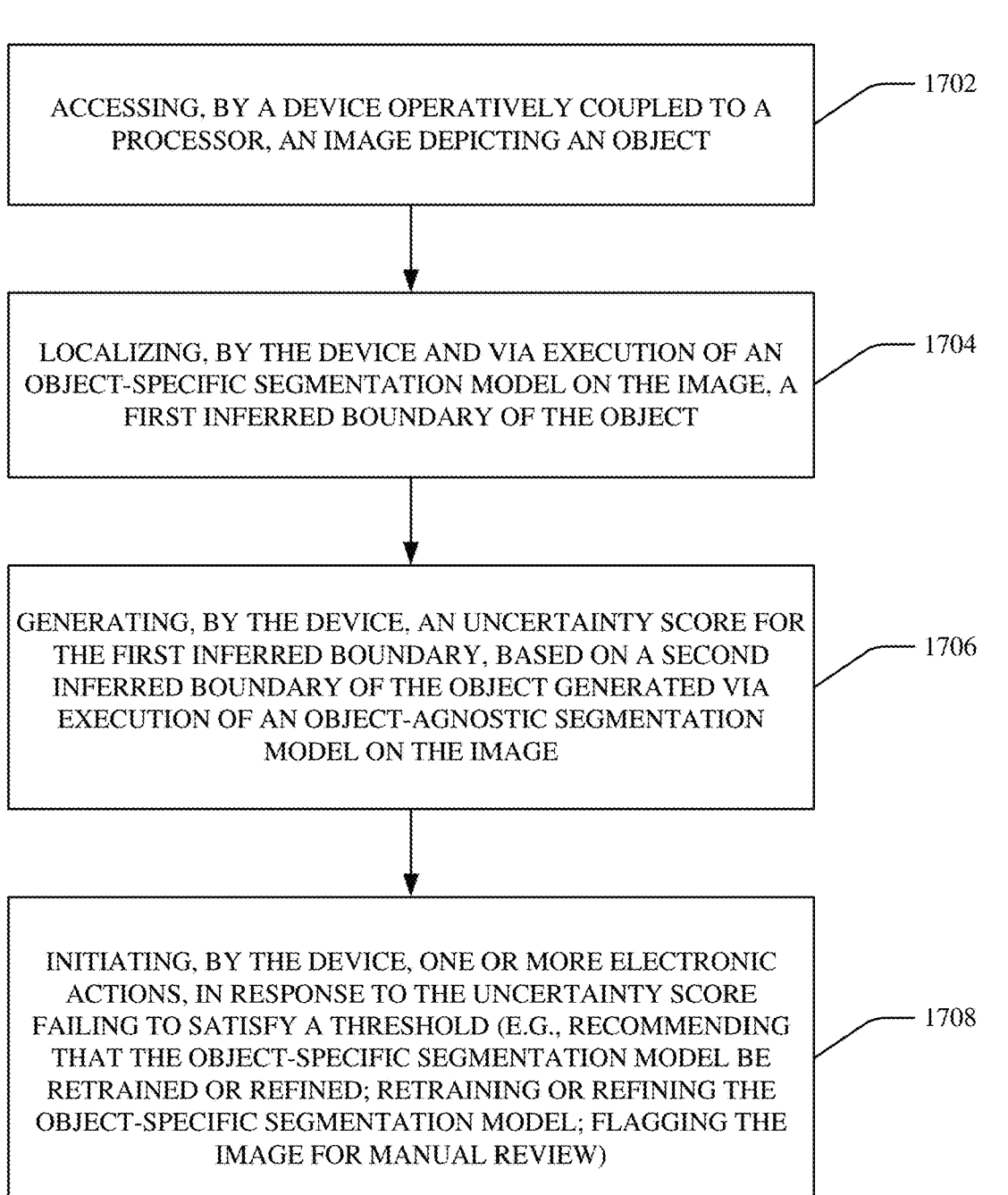

ACCESSING, BY A DEVICE OPERATIVELY COUPLED TO A PROCESSOR, AN IMAGE DEPICTING AN OBJECT — 1702

LOCALIZING, BY THE DEVICE AND VIA EXECUTION OF AN OBJECT-SPECIFIC SEGMENTATION MODEL ON THE IMAGE, A FIRST INFERRED BOUNDARY OF THE OBJECT — 1704

GENERATING, BY THE DEVICE, AN UNCERTAINTY SCORE FOR THE FIRST INFERRED BOUNDARY, BASED ON A SECOND INFERRED BOUNDARY OF THE OBJECT GENERATED VIA EXECUTION OF AN OBJECT-AGNOSTIC SEGMENTATION MODEL ON THE IMAGE — 1706

INITIATING, BY THE DEVICE, ONE OR MORE ELECTRONIC ACTIONS, IN RESPONSE TO THE UNCERTAINTY SCORE FAILING TO SATISFY A THRESHOLD (E.G., RECOMMENDING THAT THE OBJECT-SPECIFIC SEGMENTATION MODEL BE RETRAINED OR REFINED; RETRAINING OR REFINING THE OBJECT-SPECIFIC SEGMENTATION MODEL; FLAGGING THE IMAGE FOR MANUAL REVIEW) — 1708

FIG. 17

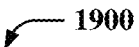
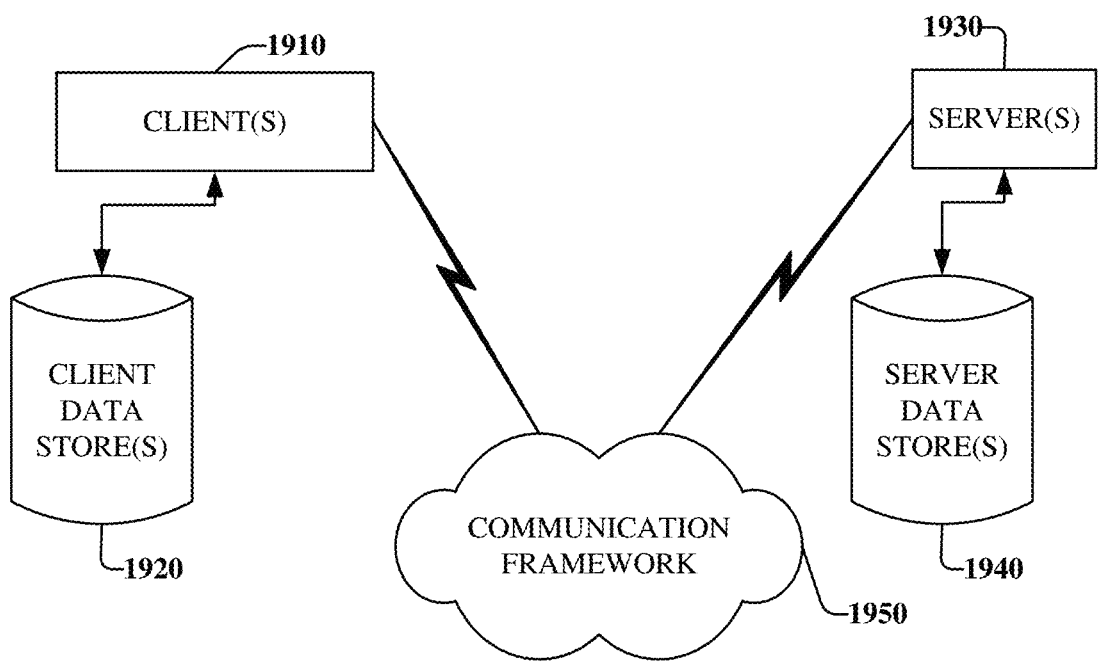
FIG. 19

UNCERTAINTY ESTIMATION VIA OBJECT-SPECIFIC AND OBJECT-AGNOSTIC SEGMENTATION DISAGREEMENT

TECHNICAL FIELD

The subject disclosure relates generally to segmentation models, and more specifically to improved uncertainty estimation via object-specific and object-agnostic segmentation disagreement.

BACKGROUND

A segmentation model can be trained to localize boundaries of objects depicted in inputted images. After being trained, the segmentation model can be deployed in the field so as to predict or infer object boundaries for inputted images that lack ground-truth annotations. When the segmentation model predicts or infers an object boundary in the field, it can often be desirable to determine a level of uncertainty associated with that prediction/inference. Unfortunately, existing techniques for generating such uncertainty levels require rigid architectural restrictions of the segmentation model, specialized training protocols for the segmentation model, or excessive computational complexity.

Accordingly, systems or techniques that can facilitate improved uncertainty computation for segmentation models can be desirable.

SUMMARY

The following presents a summary to provide a basic understanding of one or more embodiments. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatus or computer program products that facilitate improved uncertainty estimation via object-specific and object-agnostic segmentation disagreement are described.

According to one or more embodiments, a system is provided. The system can comprise a non-transitory computer-readable memory that can store computer-executable components. The system can further comprise a processor that can be operably coupled to the non-transitory computer-readable memory and that can execute the computer-executable components stored in the non-transitory computer-readable memory. In various embodiments, the computer-executable components can comprise an access component that can access an image depicting an object. In various aspects, the computer-executable components can comprise an object-specific component that can localize, via execution of an object-specific segmentation model on the image, a first inferred boundary of the object. In various instances, the computer-executable components can comprise an uncertainty component that can generate an uncertainty score for the first inferred boundary, based on a second inferred boundary of the object generated via execution of an object-agnostic segmentation model on the image.

According to one or more embodiments, a computer-implemented method is provided. In various embodiments, the computer-implemented method can comprise accessing, by a device operatively coupled to a processor, an image depicting an object. In various aspects, the computer-implemented method can comprise localizing, by the device and via execution of an object-specific segmentation model on the image, a first inferred boundary of the object. In various instances, the computer-implemented method can comprise generating, by the device, an uncertainty score for the first inferred boundary, based on a second inferred boundary of the object generated via execution of an object-agnostic segmentation model on the image.

According to one or more embodiments, a computer program product for facilitating improved uncertainty estimation via object-specific and object-agnostic segmentation disagreement is provided. In various embodiments, the computer program product can comprise a non-transitory computer-readable memory having program instructions embodied therewith. In various aspects, the program instructions can be executable by a processor to cause the processor to access a medical image depicting an anatomical structure of a medical patient. In various instances, the program instructions can be further executable to cause the processor to localize, via execution of a structure-specific segmentation model on the medical image, a first inferred boundary of the anatomical structure. In various cases, the program instructions can be further executable to cause the processor to generate an uncertainty score for the first inferred boundary, based on a second inferred boundary of the anatomical structure generated via execution of a structure-agnostic segmentation model on the medical image. In various aspects, the program instructions can be further executable to cause the processor to recommend or perform, in response to the uncertainty score failing to satisfy a threshold, retraining of the structure-specific segmentation model.

DESCRIPTION OF THE DRAWINGS

FIG. 3 illustrates an example, non-limiting block diagram showing how a first inferred object boundary can be generated via an object-specific segmentation model in accordance with one or more embodiments described herein.

FIG. 17 illustrates a flow diagram of an example, non-limiting computer-implemented method that facilitates improved uncertainty estimation via object-specific and object-agnostic segmentation disagreement in accordance with one or more embodiments described herein.

FIG. 19 illustrates an example networking environment operable to execute various implementations described herein.

DETAILED DESCRIPTION

Figure 1:
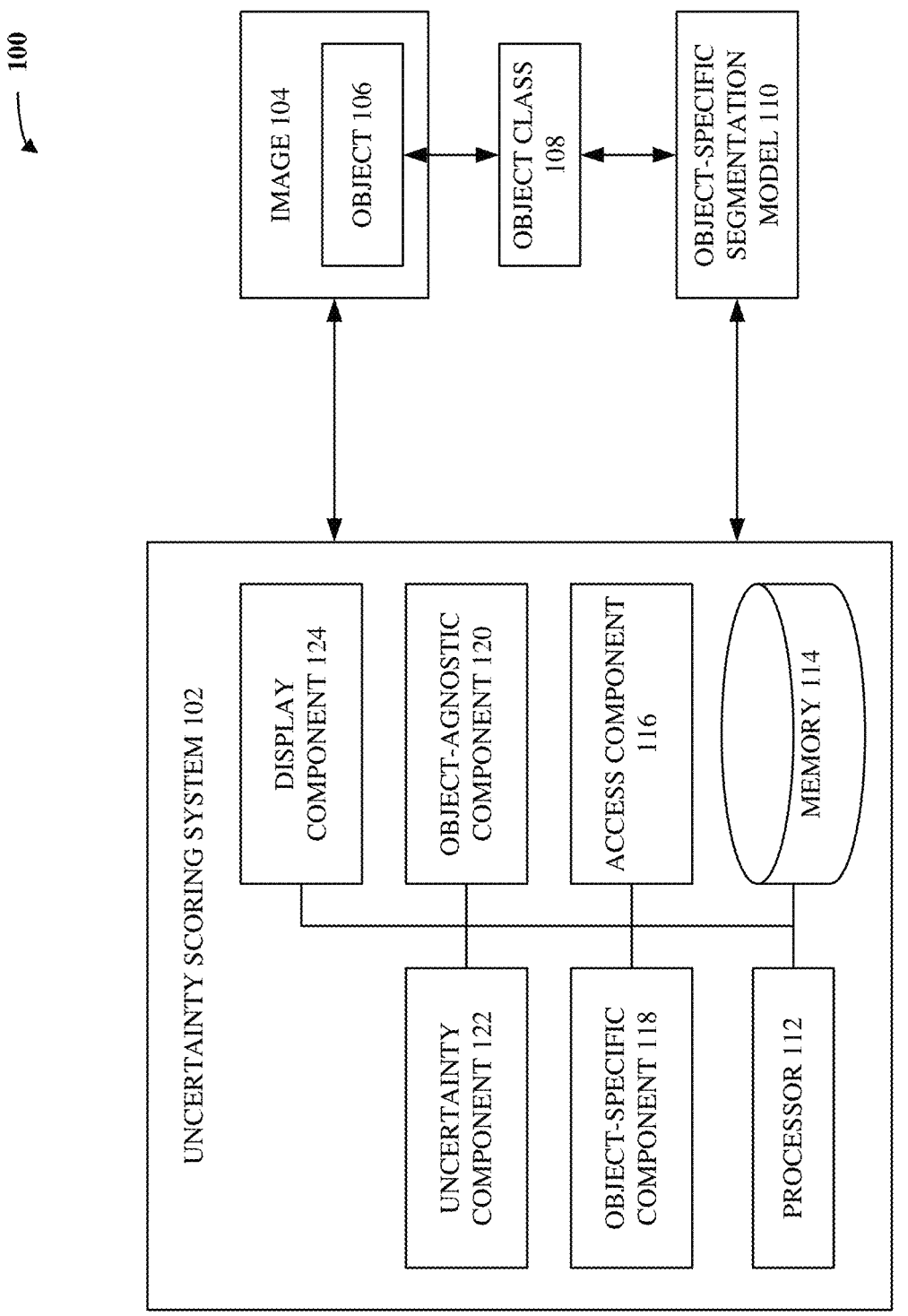
FIG. 1 illustrates a block diagram of an example, non-limiting system that facilitates improved uncertainty estimation via object-specific and object-agnostic segmentation disagreement in accordance with one or more embodiments described herein.

The following detailed description is merely illustrative and is not intended to limit embodiments or application/uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

A segmentation model can be a deep learning neural network that can be trained (e.g., in supervised fashion, unsupervised fashion, or reinforcement learning fashion) to segment or localize boundaries of objects depicted in inputted images. After being trained, the segmentation model can be deployed in the field so as to predict or infer object boundaries for images that lack ground-truth annotations. As a non-limiting example, if the segmentation model is implemented in a medical or clinical context, the segmentation model can be configured to receive as input medical images (e.g., computed tomography (CT) scanned images, magnetic resonance imaging (MRI) scanned images, X-ray scanned images, ultrasound scanned images, positron emission tomography (PET) scanned images) associated with real-world medical patients and to segment or localize as output boundaries of anatomical structures (e.g., lungs, kidneys, tumors, blood vessels) that are depicted in such medical images. As yet another non-limiting example, if the segmentation model is implemented in an autonomous driving context, the segmentation model can be configured to receive as input images captured by vehicular cameras (e.g., images recorded by one or more cameras mounted on a self-driving vehicle, where such such images show roadway or traffic in front of the self-driving vehicle, roadway or traffic behind the self-driving vehicle, or roadway or traffic beside the self-driving vehicle) and to segment or localize as output boundaries of traffic-related objects (e.g., road lanes, sidewalks, street signs, other vehicles, pedestrians) that are depicted in such images. As even another non-limiting example, if the segmentation model is implemented in a sporting context, the segmentation model can be configured to receive as input images of sporting events (e.g., images of tennis matches) and to segment or localize as output boundaries of sports-related objects (e.g., tennis racquet, tennis ball, baseline, sidelines, service boxes, net) that are depicted in such images.

In any case, when the segmentation model predicts or infers an object boundary in the field, it can often be desirable to determine a level of uncertainty associated with that prediction/inference. Indeed, in some cases, such uncertainty computations can be required by regulatory entities (e.g., especially in the medical/clinical context or the autonomous driving context), in view of the fact that segmentation uncertainty can be expected to increase (or segmentation confidence can be expected to decrease) when the images on which the segmentation model is being inferenced are different in some respect from the images on which the segmentation model was trained (e.g., different demographics or feature distributions represented in the images, different acquisition protocols used to generate or capture the images).

Unfortunately, existing techniques for generating such uncertainty levels require the segmentation model to obey rigid architectural restrictions, require the segmentation model to undergo specialized training protocols, or are otherwise excessively computationally complex. For instance, Markov Chain Monte Carlo (MCMC) dropout techniques generate uncertainty maps for a segmentation model by dropping out, during inference, different layers or different neurons of the segmentation model. Although MCMC dropout can accurately or precisely measure uncertainty, it is applicable only to specially structured segmentation models. Specifically, in order for MCMC dropout to be applied to a given segmentation model, the given segmentation model must first be configured to have dropout layers or dropout neurons in the absence of which the given segmentation model can still function or operate. Indeed, if a non-dropout layer or a non-dropout neuron of the given segmentation model were dropped out, the given segmentation model would simply cease to function or operate. Accordingly, MCMC dropout can be implemented only on specialized network architectures (e.g., only on segmentation models that are built or designed with dropout layers or dropout neurons) and thus is not a universal or generalizable technique (e.g., most segmentation models are not built or designed with dropout layers or dropout neurons).

In other cases, Stochastic Weight Averaging (SWAG) techniques quantify uncertainty by iteratively calculating means and covariance matrices of internal parameters during training. Although SWAG techniques can measure with sufficient accuracy or precision the uncertainty of a particular segmentation model, such techniques require specialized computations to be performed during training of the particular segmentation model (e.g., require the means and covariance matrices of the internal parameters of the particular segmentation model to be iteratively tracked through each training epoch). In other words, if a segmentation model is trained without such specialized computations, then SWAG cannot be applied to that segmentation model. Thus, SWAG techniques are not universal or generalizable (e.g., during training of most segmentation models, means and covariance matrices of internal parameter distributions are not tracked or recorded). Moreover, SWAG techniques often rely upon dubious assumptions (e.g., assuming a Gaussian distribution without theoretical justification), which further reduces the utility of SWAG techniques.

In yet other cases, Test-Time Augmentation techniques quantify uncertainty of a given segmentation model by augmenting input images in ways that were not represented in the images on which the given segmentation model was trained. That is, multiple copies of an input image are created, such multiple copies are differently augmented (e.g., rotated, shifted, reflected, scaled up or down) in ways that introduce variety or variation that was not present in the images on which the given segmentation model was trained, the given segmentation model is executed on such augmented multiple copies, and the uncertainty of the given segmentation model is derived based on how much the given segmentation model appears to be affected by the augmentations. Although Test-Time Augmentation does not rely upon a particular type of network architecture or a particular type of training protocol, Test-Time Augmentation does require prior knowledge of augmentations that were already present or represented in the training images. Indeed, Test-Time Augmentation can involve meaningfully augmenting an input image with the intention of diversifying that input image from the training images, but what constitutes a meaningful augmentation cannot be known if the augmentations that were already included in the training images are unknown. Accordingly, Test-Time Augmentation techniques are not universal or generalizable (e.g., the end-users of most segmentation models often do not know what augmentations were already implemented during training).

In even other cases, Deep Ensemble techniques quantify uncertainty by separately training multiple versions of a particular segmentation model, each of which beginning with a different random initialization. That is, multiple copies of a segmentation model can be created, the internal parameters of such multiple copies can each be differently randomly initialized, each of such multiple copies can be separately or independently trained, each of such separately or independently trained models can be executed on a same input image, and the degree of agreement or disagreement among such separately or independently trained models can indicate how uncertainly the models can analyze the input image. Although Deep Ensemble techniques do not rely upon specific network architectures or specific training protocols, they are extremely computationally expensive. Indeed, fully training one segmentation model can be considered as time-consuming or resource-intensive. Thus, fully training, in separate or independent fashion, tens, dozens, or even hundreds of segmentation models can be considered as extremely or excessively time-consuming and resource-intensive.

Accordingly, systems or techniques that can address one or more of these technical problems can be desirable.

Various embodiments described herein can address one or more of these technical problems. One or more embodiments described herein can include systems, computer-implemented methods, apparatus, or computer program products that can facilitate improved uncertainty estimation via object-specific and object-agnostic segmentation disagreement. In other words, the inventors of various embodiments described herein devised a technique for determining or quantifying a level of uncertainty (e.g., an uncertainty score) of a segmentation model with respect to an input image that lacks a ground-truth, where such technique does not suffer from the same disadvantages as existing techniques for generating such uncertainty levels. In still other words, the present inventors devised a way of quantifying segmentation model uncertainty that does not involve the rigid architectural restrictions, the specialized training protocols, or the excessive computational complexity or memory costs that plague existing techniques.

In particular, the present inventors recognized that the vast majority of segmentation models that are deployed in the field can be considered as object-specific. That is, during training, such segmentation models learn how to segment or localize the boundaries of only one or more specifically delineated types of objects. For example, in the medical/clinical context, a segmentation model can be trained to segment or localize the boundaries of kidneys depicted in medical images. Such segmentation model can thus be considered as kidney-specific and cannot be expected to reliably or accurately segment or localize the boundaries of non-kidney objects. As another example, in the autonomous vehicle context, a segmentation model can be trained to segment or localize the boundaries of pedestrians and of traffic lanes depicted in roadside images (e.g., to determine whether a pedestrian is present in a traffic lane). Such segmentation model can thus be considered as being specific to pedestrians and to traffic lanes, and such segmentation model cannot be expected to reliably or accurately segment or localize the boundaries of objects that are neither pedestrians nor traffic lanes. As yet another example, in the sporting context, a segmentation model can be trained to segment or localize the boundaries of tennis balls and of tennis service boxes depicted in sports images (e.g., to determine whether a tennis player's serve is in-bounds or out-of-bounds). Such segmentation model can thus be considered as being specific to tennis balls and to tennis service boxes, and such segmentation model cannot be expected to reliably or accurately segment or localize the boundaries of objects that are neither tennis balls nor tennis service boxes.

In any case, the present inventors realized that uncertainty associated with object-specific segmentation models can be computed or derived, based upon how much such object-specific segmentation models disagree with object-agnostic segmentation models. More specifically, an object-agnostic segmentation model can be a segmentation model that is trained to segment or localize boundaries of generic (e.g., not specifically delineated types of) objects depicted in inputted images, based upon user-provided input (e.g., based upon user-provided clicks, based upon user-provided bounding boxes, based upon user-provided text prompts) associated with those inputted images. So, for any given object depicted in an image, a first boundary of that object can be segmented or localized by an object-specific segmentation model, a second boundary of that object can be segmented or localized by an object-agnostic segmentation model, and an uncertainty score can be computed by comparing the first boundary to the second boundary. If the first and second boundaries match or are otherwise within a threshold level of similarity of each other (e.g., if they agree), it can be concluded that the object-specific segmentation model was executed on the image with low uncertainty. On the other hand, if the first and second boundaries are not within a threshold level of similarity of each other (e.g., if they disagree), it can be concluded that the object-specific segmentation model was executed on the image with high uncertainty.

Various embodiments described herein can be considered as a computerized tool (e.g., any suitable combination of computer-executable hardware or computer-executable software) that can facilitate improved uncertainty estimation via object-specific and object-agnostic segmentation disagreement. In various aspects, such computerized tool can comprise an access component, an object-specific component, an object-agnostic component, an uncertainty component, or a display component.

In various embodiments, there can be a given image. In various aspects, the given image can exhibit any suitable format, size, or dimensionality (e.g., can be a two-dimensional pixel array or a three-dimensional voxel array). In various instances, the given image can be captured by any suitable imaging equipment in any suitable operational context (e.g., can be captured by medical imaging equipment in a medical/clinical operational context, can be captured by vehicular cameras in an autonomous driving operational context, can be captured by sports cameras in a sporting operational context). In various cases, the given image can depict or illustrate any suitable object. In various aspects, that object can be considered as belonging to a particular object class. In various instances, the particular object class can depend upon the operational context of the given image (e.g., in the medical/clinical operational context, the particular object class can be a specific class or type of anatomical structure; in the autonomous driving operational context, the particular object class can be a specific class or type of traffic-related structure; in the sporting operational context, the particular object class can be a specific class or type of sports-related structure).

In various embodiments, there can be an object-specific segmentation model. In various aspects, the object-specific segmentation model can exhibit any suitable deep learning internal architecture. For example, the object-specific segmentation model can include any suitable numbers of any suitable types of layers (e.g., input layer, one or more hidden layers, output layer, any of which can be convolutional layers, dense layers, non-linearity layers, pooling layers, batch normalization layers, or padding layers). As another example, the object-specific segmentation model can include any suitable numbers of neurons in various layers (e.g., different layers can have the same or different numbers of neurons as each other). As yet another example, the object-specific segmentation model can include any suitable activation functions (e.g., softmax, sigmoid, hyperbolic tangent, rectified linear unit) in various neurons (e.g., different neurons can have the same or different activation functions as each other). As still another example, the object-specific segmentation model can include any suitable interneuron connections or interlayer connections (e.g., forward connections, skip connections, recurrent connections).

Regardless of its internal architecture, the object-specific segmentation model can be configured to segment or localize the boundaries of objects that are depicted in inputted images and that belong to the particular object class. Accordingly, the object-specific segmentation model can be considered as being specific or tailored to the particular object class, hence the term "object-specific". In various aspects, the object-specific segmentation model can have been trained in any suitable fashion to segment or localize object boundaries (e.g., supervised training, unsupervised training, reinforcement learning).

In various aspects, it can be desired to execute the object-specific segmentation model on the given image and to determine a level of uncertainty associated with such execution. In various instances, the computerized tool described herein can facilitate such uncertainty determination.

In various embodiments, the access component of the computerized tool can electronically receive or otherwise electronically access the given image or the object-specific segmentation model. In some aspects, the access component can electronically retrieve the given image or the object-specific segmentation model from any suitable centralized or decentralized data structures (e.g., graph data structures, relational data structures, hybrid data structures), whether remote from or local to the access component. In any case, the access component can electronically obtain or access the given image or the object-specific segmentation model, such that other components of the computerized tool can electronically interact with (e.g., read, write, edit, copy, manipulate) the given image or with the object-specific segmentation model.

In various embodiments, the object-specific component of the computerized tool can electronically segment or localize a first boundary of the object depicted in the given image, by executing the object-specific segmentation model on the given image. More specifically, the object-specific component can feed the given image to an input layer of the object-specific segmentation model, the given image can complete a forward pass through one or more hidden layers of the object-specific segmentation model, and an output layer of the object-specific segmentation model can compute the first boundary (or any suitable indication or representation thereof) based on activations from the one or more hidden layers of the object-specific segmentation model.

In various aspects, the first boundary can be considered as an external, circumferential, or perimetral edge (e.g., if the given image is a two-dimensional pixel array) or surface (e.g., if the given image is a three-dimensional voxel array) of the object that the object-specific segmentation model has inferred is illustrated in the given image. In various instances, the first boundary be expressed in any suitable electronic format. For example, the first boundary can be expressed, conveyed, or otherwise represented by a segmentation mask produced by the object-specific segmentation model, where such segmentation mask can indicate which individual pixels or voxels of the image are inferred, by the object-specific segmentation model, to belong to the boundary of the object.

In various embodiments, the object-agnostic component of the computerized tool can electronically store, maintain, control, or otherwise access an object-agnostic segmentation model. In various aspects, the object-agnostic segmentation model can exhibit any suitable deep learning internal architecture. For example, the object-agnostic segmentation model can include any suitable numbers of any suitable types of layers (e.g., input layer, one or more hidden layers, output layer, any of which can be convolutional layers, dense layers, non-linearity layers, pooling layers, batch normalization layers, or padding layers). As another example, the object-agnostic segmentation model can include any suitable numbers of neurons in various layers (e.g., different layers can have the same or different numbers of neurons as each other). As yet another example, the object-agnostic segmentation model can include any suitable activation functions (e.g., softmax, sigmoid, hyperbolic tangent, rectified linear unit) in various neurons (e.g., different neurons can have the same or different activation functions as each other). As still another example, the object-agnostic segmentation model can include any suitable interneuron connections or interlayer connections (e.g., forward connections, skip connections, recurrent connections).

Regardless of its internal architecture, the object-agnostic segmentation model can be configured to segment or localize the boundaries of generic objects (e.g., no matter what classes those objects belong to) that are depicted in inputted images. In other words, the object-agnostic segmentation model can be considered as not being specific or tailored to the particular object class, hence the term "object-agnostic". To overcome such lack of object specialization, the object-agnostic segmentation model can be configured to be conditioned on user-provided input data. That is, the object-agnostic segmentation model can be configured to receive as input not just an image depicting a generic object, but also a user-provided input that somehow characterizes, calls out, or otherwise indicates something about that generic object. As a non-limiting example, the user-provided input can be a set of positive clicks indicating one or more intra-image locations that are known by a user to belong to the generic object (e.g., known to be inside the generic object's boundary) and a set of negative clicks indicating one or more intra-image locations that are known by the user to not belong to the generic object (e.g., known to be outside the generic object's boundary). As another non-limiting example, the user-provided input can be a bounding box that is known to circumscribe or contain the generic object. As even another non-limiting example, the user-provided input can be a textual prompt that verbally describes one or more known characteristics of the generic object.

In various aspects, the object-agnostic component can electronically receive, retrieve, or access user-provided input associated with the given image (e.g., positive clicks or negative clicks associated with the object, a bounding box circumscribing the object, a textual prompt describing the object), and the object-agnostic component can electronically segment or localize a second boundary of the object depicted in the given image, by executing the object-agnostic segmentation model on the given image and on the user-provided input. More specifically, the object-agnostic component can feed the given image and the user-provided input to an input layer of the object-agnostic segmentation model, the given image and the user-provided input can complete a forward pass through one or more hidden layers of the object-agnostic segmentation model, and an output layer of the object-agnostic segmentation model can compute the second boundary based on activations from the one or more hidden layers of the object-agnostic segmentation model.

In various aspects, the second boundary can be considered as an external, circumferential, or perimetral edge or surface of the object that the object-agnostic segmentation model has inferred is illustrated in the given image. Just as above, the second boundary can, in various instances, be expressed in any suitable electronic format. For example, the second boundary can be expressed, conveyed, or otherwise represented by a segmentation mask produced by the object-agnostic segmentation model, where such segmentation mask can indicate which individual pixels or voxels of the given image are inferred, by the object-agnostic segmentation model, to belong to the boundary of the object.

Note how the object-specific segmentation model can functionally differ from the object-agnostic segmentation model. Indeed, the object-specific segmentation model can be considered as knowing (e.g., as having learned) to search for boundaries of objects that belong to the particular object class and as not knowing (e.g., as not having learned) to search for boundaries of objects that do not belong to the particular object class. In contrast, the object-agnostic segmentation model can be considered as knowing (e.g., as having learned) to look for boundaries of whatever generic objects are indicated by accompanying user-provided input, without regard to the object classes to which those generic objects belong or do not belong.

In various embodiments, the uncertainty component of the computerized tool can electronically generate an uncertainty score, based on the first boundary and based on the second boundary. More specifically, the uncertainty score can be equal to or otherwise based on any suitable difference or error between the first boundary and the second boundary. As some non-limiting examples, the uncertainty score can be equal to otherwise based on a mean absolute error (MAE), mean squared error (MSE), or cross-entropy error computed between the first boundary and the second boundary. In other instances, the uncertainty score can be equal to otherwise based on any similarity metric that can be computed between the first boundary and the second boundary. As a non-limiting example, the uncertainty score can be equal to otherwise based on a Dice score computed between the first boundary and the second boundary.

In any case, the uncertainty score can be a scalar whose magnitude indicates how similar or dissimilar the first and second boundaries are. In other words, the uncertainty score can be considered as measuring a level of disagreement between the first boundary and second boundary. The more disagreement (e.g., the less similarity) there is between the first boundary and the second boundary, the less certain or confident the first boundary can be considered. On the other hand, the less disagreement (e.g., the more similarity) there is between the first boundary and the second boundary, the more certain or confident the first boundary can be considered.

In various embodiments, the display component of the computerized tool can take any suitable electronic actions based upon the uncertainty score. In various aspects, the display component can electronically render, on any suitable electronic display (e.g., computer screen or monitor) the uncertainty score. In other aspects, the display component can electronically transmit the uncertainty score to any suitable computing device. In some instances, the display component can electronically render, on the electronic display, the first boundary or the second boundary (e.g., the first and second boundaries can be superimposed over the given image). In other instances, the display component can electronically render one or more non-overlap regions (e.g., a symmetric difference) between the first boundary and the second boundary, thereby visually emphasizing where (e.g., which individual pixels or voxels) the first and second boundary disagree.

In this way, the computerized tool can be considered as quantifying a level of uncertainty associated with the first boundary segmented or localized by the object-specific segmentation model. Note that such quantification can be facilitated, no matter the internal architecture of the object-specific segmentation model and no matter how the object-specific segmentation model was trained. Furthermore, note that such quantification can be facilitated without spending exorbitant time or resources on creating an ensemble of tens or dozens of independently-trained versions of the object-specific segmentation model.

In order to help ensure that the second boundary is accurate or reliable, the object-agnostic segmentation model can undergo any suitable type or paradigm of training. Accordingly, the computerized tool can comprise a training component that can train the object-agnostic segmentation model in any suitable fashion on a training dataset. As a non-limiting example, the training dataset can be annotated, and the training component can thus facilitate supervised training of the object-agnostic segmentation model.

Various embodiments described herein can be employed to use hardware or software to solve problems that are highly technical in nature (e.g., to facilitate improved uncertainty estimation via object-specific and object-agnostic segmentation disagreement), that are not abstract and that cannot be performed as a set of mental acts by a human. Further, some of the processes performed can be performed by a specialized computer (e.g., deep learning neural networks having internal parameters such as convolutional kernels) for carrying out defined acts related to deep learning.

For example, such defined acts can include: accessing, by a device operatively coupled to a processor, an image depicting an object; localizing, by the device and via execution of an object-specific segmentation model on the image, a first inferred boundary of the object; and generating, by the device, an uncertainty score for the first inferred boundary, based on a second inferred boundary of the object generated via execution of an object-agnostic segmentation model on the image.

Such defined acts are not performed manually by humans. Indeed, neither the human mind nor a human with pen and paper can electronically access an image depicting an object, electronically localize a first inferred boundary of that object by executing an object-specific segmentation model, electronically localize a second inferred boundary of that object by executing an object-agnostic segmentation model, and electronically leverage the second inferred boundary to generate an uncertainty score for the first inferred boundary. Indeed, a deep learning neural network is an inherently-computerized construct that simply cannot be meaningfully executed or trained in any way by the human mind without computers. Furthermore, image segmentation is an inherently-computerized inferencing task that cannot be meaningfully implemented in any way by the human mind without computers. Further still, uncertainty scoring of image segmentation results is an inherently-computerized accessory task that is intertwined with deep learning neural networks configured to perform image segmentation. Accordingly, a computerized tool that can generate uncertainty scores for object boundaries localized by object-specific segmentation models, via execution of object-agnostic segmentation models, is likewise inherently-computerized and cannot be implemented in any sensible, practical, or reasonable way without computers.

Moreover, various embodiments described herein can integrate into a practical application various teachings relating to improved uncertainty estimation via object-specific and object-agnostic segmentation disagreement. As explained above, existing techniques for facilitating uncertainty scoring suffer from various significant disadvantages. Specifically, some techniques (e.g., MCMC dropout) can be applied only to segmentation models with very specific structures (e.g., only neural networks that have built-in dropout layers) and are thus not generalizable. Moreover, other techniques (e.g., SWAG techniques) can be applied only to segmentation models that have been trained in a very specific fashion (e.g., where means or covariance matrices of internal parameters had been computed at each training epoch) and are thus also not generalizable. Furthermore, still other techniques (e.g., Test-Time Augmentation) can be applied only to segmentation models for which the specific content of the training images is known (e.g., meaningful augmentations to apply to input images cannot be determined if the augmentations that were already present in the training images are not known). Further still, yet other techniques (e.g., Deep Ensemble techniques) consume extremely many computational resources (e.g., require duplicative training, from scratch, of several randomly-initialized segmentation models).

In stark contrast, various embodiments described herein can address these technical problems. Specifically, various embodiments described herein can involve: executing an already-trained object-specific segmentation model on an image that depicts an object, thereby yielding a first inferred boundary of the object; executing an object-agnostic segmentation model on the image, thereby yielding a second inferred boundary of the object, and generating an uncertainty score for the first inferred boundary by comparing it to the second inferred boundary. Such technique can be applied, no matter how many or what types of layers the already-trained object-specific segmentation model has, no matter how many neurons or what types of activation functions the already-trained object-specific segmentation model has, no matter the types or arrangement of interneuron connections of the already-trained object-specific segmentation model, no matter how the already-trained object-specific segmentation model was trained, and no matter the content of the training images on which the already-trained object-specific segmentation model was trained. Accordingly, such technique can be considered as being generalizable across segmentation model architectures and across training paradigms. Furthermore, because training one object-agnostic segmentation model can be much less computationally expensive than training several different instantiations of the object-specific segmentation model, such technique can be considered as much less computationally intensive as compared to ensemble techniques. A computerized tool that can implement such technique certainly constitutes a concrete and tangible technical improvement in the field of segmentation models. Therefore, various embodiments described herein clearly qualify as useful and practical applications of computers.

Furthermore, various embodiments described herein can control real-world tangible devices based on the disclosed teachings. For example, various embodiments described herein can electronically train or execute real-world segmentation models on real-world images (e.g., X-ray scanned images, CT scanned images), and can electronically render real-world segmentation results (e.g., localized object boundaries) on real-world computer screens.

It should be appreciated that the herein figures and description provide non-limiting examples of various embodiments and are not necessarily drawn to scale.

FIG. 1 illustrates a block diagram of an example, non-limiting system 100 that can facilitate improved uncertainty estimation via object-specific and object-agnostic segmentation disagreement in accordance with one or more embodiments described herein. As shown, an uncertainty scoring system 102 can be electronically integrated, via any suitable wired or wireless electronic connections, with an image 104 and with an object-specific segmentation model 110.

In various embodiments, the image 104 can be any suitable type of image exhibiting any suitable format, size, or dimensionality. As a non-limiting example, the image 104 can be an x-by-y pixel array, for any suitable positive integers x and y. As another non-limiting example, the image 104 can be an x-by-y-by-z voxel array, for any suitable positive integers x, y, and z. In various instances, the image 104 can be captured or otherwise generated by any suitable imaging equipment (not shown) implemented in any suitable operational context. As a non-limiting example, the image 104 can be associated with a medical or clinical operational context. In such case, the image 104 can be captured or generated by any suitable medical scanners (e.g., X-ray scanner, CT scanner, MRI scanner, ultrasound scanner, PET scanner). As another non-limiting example, the image 104 can be associated with an autonomous driving operational context. In such case, the image 104 can be captured or generated by any suitable vehicular cameras (e.g., front-facing, rear-facing, or side-facing cameras integrated into the fenders, body panels, or interior of an autonomous vehicle). As yet another non-limiting example, the image 104 can be associated with a sporting operational context. In such case, the image 104 can be captured or generated by any suitable camera that is watching or monitoring a sporting event (e.g., a tennis match).

In any case, the image 104 can depict an object 106. In various aspects, the object 106 can be any suitable structure, thing, or matter that is visually illustrated, shown, or depicted within the image 104. In various instances, the object 106 can be considered as belonging to or otherwise being an instantiation of an object class 108. In various cases, the object class 108 can be considered as a delineated or specified type of object. In various aspects, the object 106 and the object class 108 can be dependent upon the operational context of the image 104.

As a non-limiting example, suppose that the image 104 is in a medical or clinical operational context. In such case, the object class 108 can be any suitable type or group of anatomical structure (e.g., a type or group of tissue, a type or group of organ, a type or group of body part, a type or group of bodily fluid), and the object 106 can be an instantiation of such anatomical structure that is depicted in the image 104. For instance, if the object class 108 is a kidney class, then the object 106 can be a kidney illustrated in the image 104. As another instance, if the object class 108 is a brain tumor class, then the object 106 can be a tumor of a brain illustrated in the image 104. As yet another instance, if the object class 108 is a vessel calcification class, then the object 106 can be a calcified portion of a blood vessel illustrated in the image 104.

As another non-limiting example, suppose that the image 104 is in an autonomous driving operational context. In such case, the object class 108 can be any suitable type or group of traffic-related thing, and the object 106 can be an instantiation of such traffic-related thing. For instance, if the object class 108 is a pedestrian class, then the object 106 can be a pedestrian on or near a road illustrated in the image 104. As another instance, if the object class 108 is a lane class, then the object 106 can be a lane of a road illustrated in the image 104. As even another instance, if the object class 108 is a crosswalk class, then the object 106 can be a crosswalk that cuts across a road illustrated in the image 104.

As yet another non-limiting example, suppose that the image 104 is in a sporting operational context. In such case, the object class 108 can be any suitable type or group of sports-related thing, and the object 106 can be an instantiation of such sports-related thing. For instance, if the object class 108 is a racquet class, then the object 106 can be a tennis racquet being swung by a tennis player illustrated in the image 104. As another instance, if the object class 108 is a ball class, then the object 106 can be a tennis ball being hit by a tennis player illustrated in the image 104.

Although FIG. 1 shows that the image 104 can depict the object 106 belonging to the object class 108, this is a mere non-limiting example for ease of illustration and explanation. In various aspects, the image 104 can depict any suitable number of objects which can respectively belong to any suitable number of object classes.

In various embodiments, the object-specific segmentation model 110 can be any suitable artificial neural network that can have or otherwise exhibit any suitable internal architecture. For instance, the object-specific segmentation model 110 can have an input layer, one or more hidden layers, and an output layer. In various instances, any of such layers can be coupled together by any suitable interneuron connections or interlayer connections, such as forward connections, skip connections, or recurrent connections. Furthermore, in various cases, any of such layers can be any suitable types of neural network layers having any suitable learnable or trainable internal parameters. For example, any of such input layer, one or more hidden layers, or output layer can be convolutional layers, whose learnable or trainable parameters can be convolutional kernels. As another example, any of such input layer, one or more hidden layers, or output layer can be dense layers, whose learnable or trainable parameters can be weight matrices or bias values. As still another example, any of such input layer, one or more hidden layers, or output layer can be batch normalization layers, whose learnable or trainable parameters can be shift factors or scale factors. Further still, in various cases, any of such layers can be any suitable types of neural network layers having any suitable fixed or non-trainable internal parameters. For example, any of such input layer, one or more hidden layers, or output layer can be non-linearity layers, padding layers, pooling layers, or concatenation layers.

In various aspects, the object-specific segmentation model 110 can be configured to receive as input images having the same format, size, or dimensionality as the image 104 and to segment or localize as output the boundaries of whatever objects belonging to the object class 108 that are depicted in those inputted images. That is, for any given image that depicts an object belonging to the object class 108, the object-specific segmentation model 110 can be configured to locate a boundary edge or boundary surface of that object. In various instances, the object-specific segmentation model 110 can have been previously trained in any suitable fashion to facilitate such segmentation or localization of boundaries of objects belonging to the object class 108. For instance, the object-specific segmentation model 110 can have been trained in supervised fashion on annotated images. Indeed, such annotated images can have depicted any suitable objects belonging to the object class 108, and the ground-truth boundaries of those objects can have been known or otherwise available. In such case, the internal parameters of the object-specific segmentation model 110 can have been initialized in any suitable fashion (e.g., random initialization), the object-specific segmentation model 110 can have been iteratively executed on such annotated images, and the internal parameters of the object-specific segmentation model 110 can have been iteratively updated by backpropagating errors between the ground-truths of those annotated images and the outputs produced by such executions. Such training can have involved any suitable error or objective function (e.g., cross-entropy), any suitable optimization algorithm (e.g., stochastic gradient descent), any suitable number of training epochs, or any suitable training batch sizes. However, this is a mere non-limiting example. In other cases, the object-specific segmentation model 110 can have been trained to segment or localize the boundaries of objects belonging to the object class 108 in unsupervised fashion or in reinforcement learning fashion.

In any case, the object-specific segmentation model 110 can be considered as having learned through its prior training to segment or localize only the boundaries of objects that belong to the object class 108 (e.g., can have not learned how to segment or localize the boundaries of objects that belong to other object classes). Accordingly, the object-specific segmentation model 110 can be considered as being specific or tailored to the object class 108, hence the term "object-specific".

In various aspects, it can be desired to execute the object-specific segmentation model 110 on the image 104, so as to segment or localize a boundary of the object 106, and it can further be desired to determine a level of uncertainty associated with such segmented or localized boundary. As described herein, the uncertainty scoring system 102 can facilitate such determination.

In various embodiments, the uncertainty scoring system 102 can comprise a processor 112 (e.g., computer processing unit, microprocessor) and a non-transitory computer-readable memory 114 that is operably or operatively or communicatively connected or coupled to the processor 112. The non-transitory computer-readable memory 114 can store computer-executable instructions which, upon execution by the processor 112, can cause the processor 112 or other components of the uncertainty scoring system 102 (e.g., access component 116, object-specific component 118, object-agnostic component 120, uncertainty component 122, display component 124) to perform one or more acts. In various embodiments, the non-transitory computer-readable memory 114 can store computer-executable components (e.g., access component 116, object-specific component 118, object-agnostic component 120, uncertainty component 122, display component 124), and the processor 112 can execute the computer-executable components.

In various embodiments, the uncertainty scoring system 102 can comprise an access component 116. In various aspects, the access component 116 can electronically receive or otherwise electronically access the image 104 or the object-specific segmentation model 110. In various instances, the access component 116 can electronically retrieve the image 104 or the object-specific segmentation model 110 from any suitable centralized or decentralized data structures (not shown) or from any suitable centralized or decentralized computing devices (not shown). In any case, the access component 116 can electronically obtain or access the image 104 or the object-specific segmentation model 110, such that other components of the uncertainty scoring system 102 can electronically interact with the image 104 or with the object-specific segmentation model 110.

In various embodiments, the uncertainty scoring system 102 can comprise an object-specific component 118. In various aspects, as described herein, the object-specific component 118 can execute the object-specific segmentation model 110 on the image 104, thereby yielding a first inferred boundary of the object 106.

In various embodiments, the uncertainty scoring system 102 can comprise an object-agnostic component 120. In various instances, as described herein, the object-agnostic component 120 can execute an object-agnostic segmentation model on the image 104, thereby yielding a second inferred boundary of the object 106.

In various embodiments, the uncertainty scoring system 102 can comprise an uncertainty component 122. In various cases, as described herein, the uncertainty component 122 can compute an uncertainty score for the first inferred boundary, based on the second inferred boundary.

In various embodiments, the uncertainty scoring system 102 can comprise a display component 124. In various aspects, as described herein, the display component 124 can render the uncertainty score, the first inferred boundary, or the second inferred boundary on any suitable electronic displays.

Figure 2:
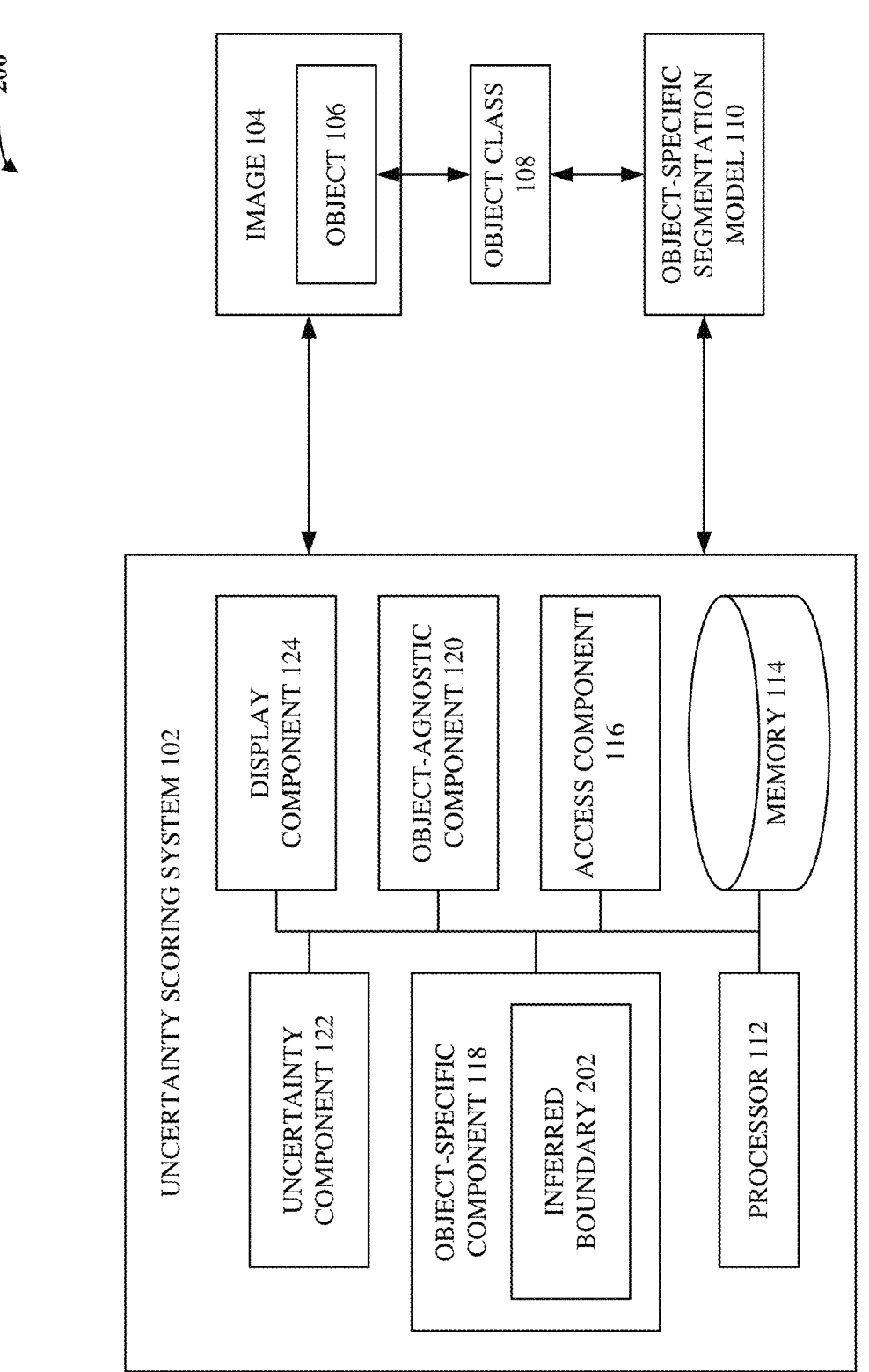
FIG. 2 illustrates a block diagram of an example, non-limiting system including a first inferred object boundary that facilitates improved uncertainty estimation via object-specific and object-agnostic segmentation disagreement in accordance with one or more embodiments described herein.

FIG. 2 illustrates a block diagram of an example, non-limiting system 200 including a first inferred object boundary that can facilitate improved uncertainty estimation via object-specific and object-agnostic segmentation disagreement in accordance with one or more embodiments described herein. As shown, the system 200 can, in some cases, comprise the same components as the system 100, and can further comprise an inferred boundary 202.

In various embodiments, the object-specific component 118 can electronically segment or localize the inferred boundary 202, by executing the object-specific segmentation model 110 on the image 104. Non-limiting aspects are described with respect to FIG. 3.

Figure 3:
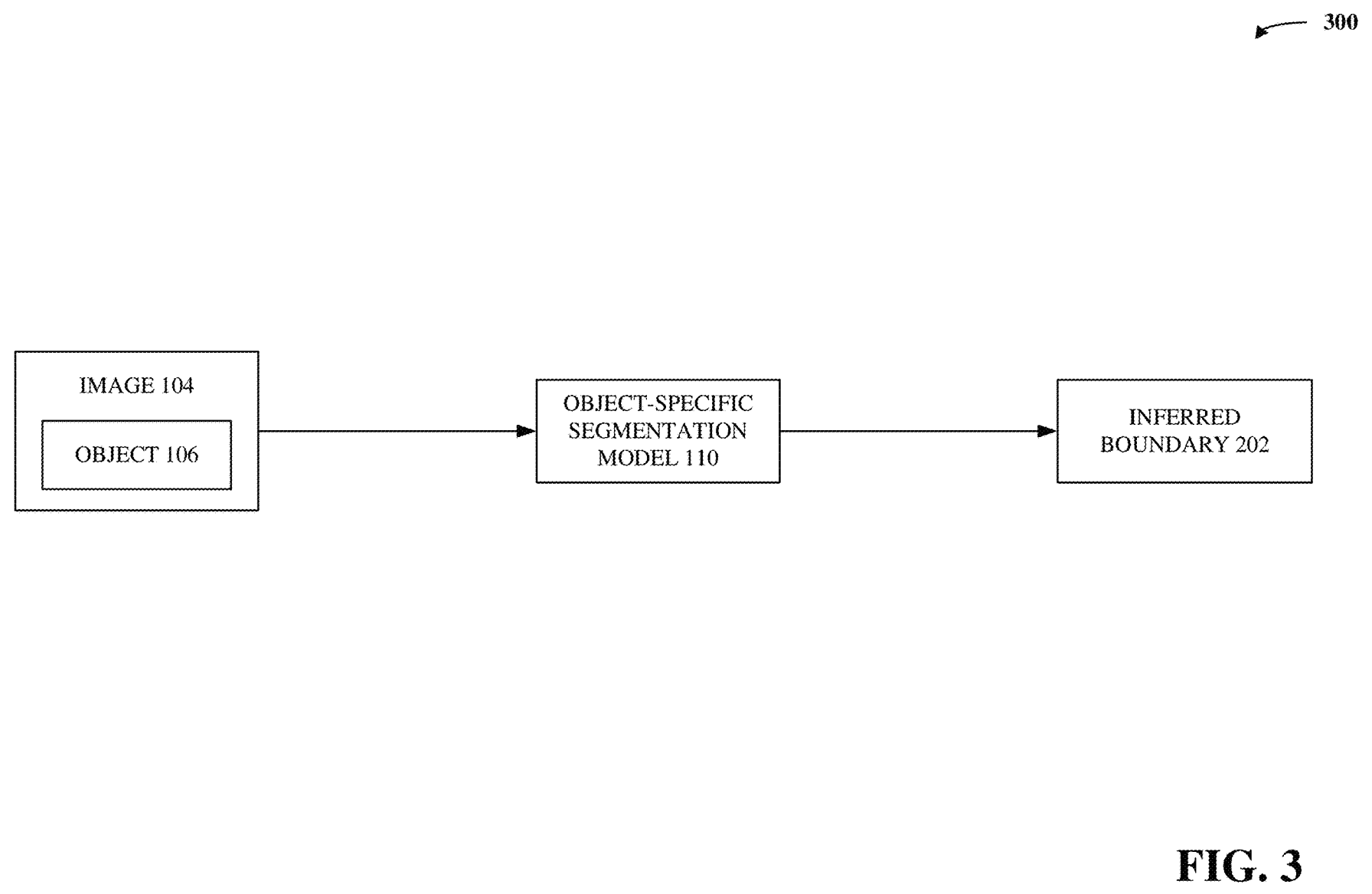

FIG. 3 illustrates an example, non-limiting block diagram 300 showing how the inferred boundary 202 can be generated via the object-specific segmentation model 110 in accordance with one or more embodiments described herein.

In various aspects, the object-specific component 118 can electronically control or otherwise electronically operate the object-specific segmentation model 110. Accordingly, in various instances, the object-specific component 118 can electronically execute the object-specific segmentation model 110 on the image 104. In various cases, such execution can cause the object-specific segmentation model 110 to segment, localize, or otherwise produce the inferred boundary 202. More specifically, the object-specific component 118 can feed the image 104 to an input layer of the object-specific segmentation model 110. In various aspects, the image 104 can complete a forward pass through one or more hidden layers of the object-specific segmentation model 110. In various instances, an output layer of the object-specific segmentation model 110 can compute or otherwise calculate the inferred boundary 202 based on activation maps generated by the one or more hidden layers of the object-specific segmentation model 110.

In any case, the inferred boundary 202 can be considered as being, indicating, conveying, or otherwise representing whatever portions of the image 104 that the object-specific segmentation model 110 believes or infers belong to the boundary of the object 106. In various various aspects, the inferred boundary 202 can be expressed in any suitable electronic format. As a non-limiting example, the inferred boundary 202 can be a segmentation mask that indicates which individual pixels (e.g., if the image 104 is an x-by-y pixel array) or which individual voxels (e.g., if the image 104 is an x-by-y-by-z voxel array) of the image 104 have been determined by the object-specific segmentation model 110 to belong to or otherwise make up the boundary of the object 106. If the image 104 is an x-by-y pixel array, the inferred boundary 202 can be considered as indicating or representing whatever the object-specific segmentation model 110 believes to be an external, circumferential, perimetral, or otherwise outermost edge of the object 106. On the other hand, if the image 104 is an x-by-y-by-z voxel array, the inferred boundary 202 can be considered as indicating or representing whatever the object-specific segmentation model 110 believes to be an external, circumferential, perimetral, or otherwise outermost surface of the object 106.

In any case, it can be desired to quantify or otherwise determine a level of uncertainty of the inferred boundary 202. As described herein, the uncertainty scoring system 102 can facilitate such quantification or determination.

Figure 4:
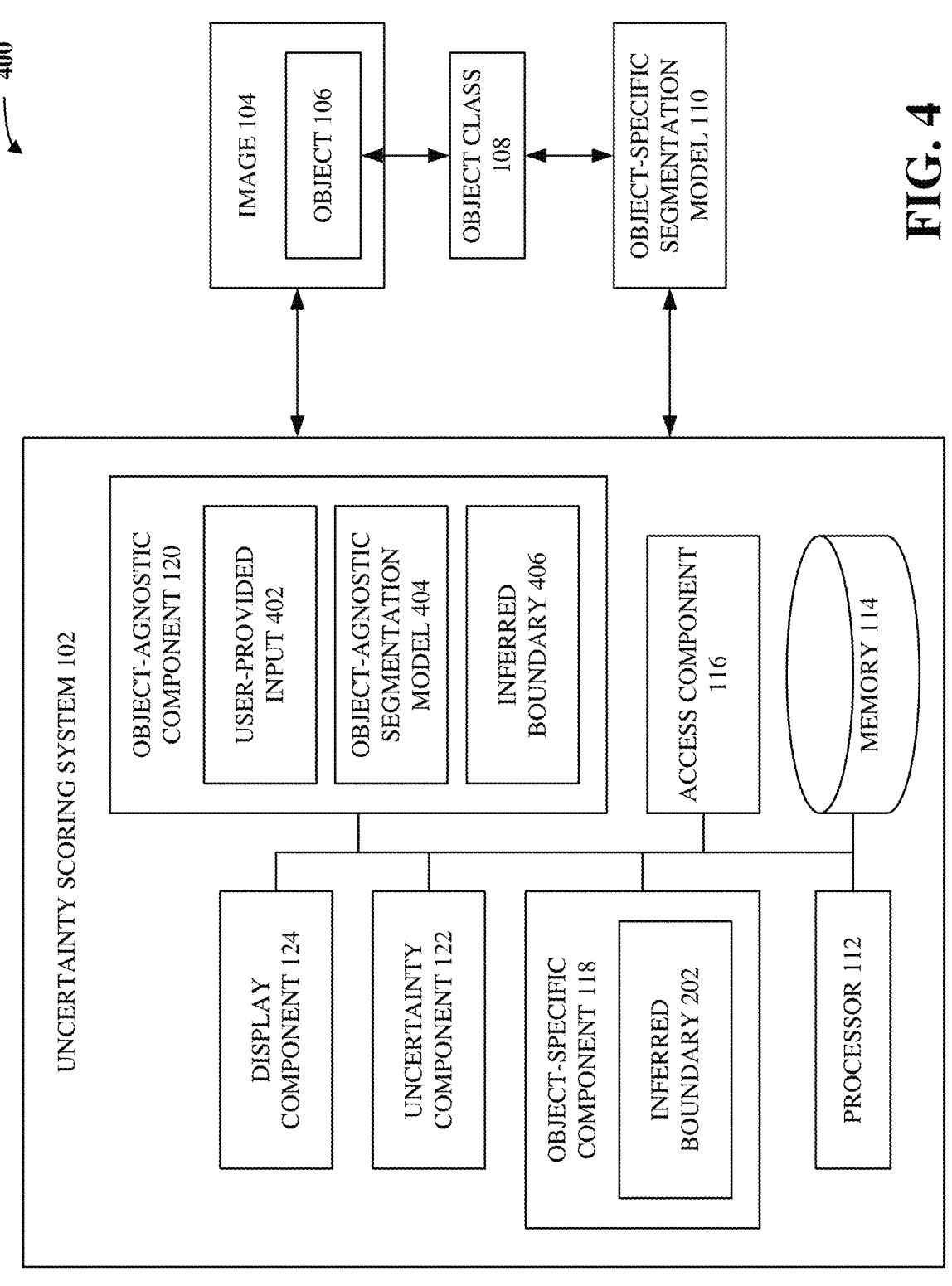
FIG. 4 illustrates a block diagram of an example, non-limiting system including an object-agnostic segmentation model, a user-provided input, and a second inferred object boundary that facilitates improved uncertainty estimation via object-specific and object-agnostic segmentation disagreement in accordance with one or more embodiments described herein.

FIG. 4 illustrates a block diagram of an example, non-limiting system 400 including an object-agnostic segmentation model, a user-provided input, and a second inferred object boundary that can facilitate improved uncertainty estimation via object-specific and object-agnostic segmentation disagreement in accordance with one or more embodiments described herein. As shown, the system 400 can, in some cases, comprise the same components as the system 200, and can further comprise a user-provided input 402, an object-agnostic segmentation model 404, and an inferred boundary 406.

In various embodiments, the object-agnostic component 120 can electronically receive, electronically retrieve, or otherwise electronically access, from any suitable source, a user-provided input 402. In various aspects, the user-provided input 402 can be any suitable electronic data that can be created by a user (e.g., via any suitable human-computer interface device such as a keyboard, keypad, or touchscreen) and that can characterize, call out, or otherwise pertain in some way to the object 106. As a non-limiting example, the user-provided input 402 can comprise a set of positive clicks (e.g., computer mouse clicks) and a set of negative clicks associated with the object 106. In such case, each positive click can be considered as indicating a respective location within the image 104 that is known or deemed by the user to belong to the object 106 or to otherwise be inside of the boundary of the object 106. Conversely, each negative click can be considered as indicating a respective location within the image 104 that is known or deemed by the user to not belong to the object 106 or to otherwise be outside of the boundary of the object 106. As another non-limiting example, the user-provided input 402 can comprise a bounding box circumscribing the object 106. In such case, the bounding box, which can be drawn by the user, can be considered as being known or deemed to contain the boundary of the object 106. As even another non-limiting example, the user-provided input 402 can comprise a text prompt pertaining to the object 106. In such case, the text prompt can describe any suitable properties or attributes of the object 106.

In various embodiments, the object-agnostic component 120 can electronically store, electronically maintain, electronically control, or otherwise electronically access the object-agnostic segmentation model 404. In various aspects, the object-agnostic segmentation model 404 can be any suitable artificial neural network that can have or otherwise exhibit any suitable internal architecture. For instance, the object-agnostic segmentation model 404 can have an input layer, one or more hidden layers, and an output layer. In various instances, any of such layers can be coupled together by any suitable interneuron connections or interlayer connections, such as forward connections, skip connections, or recurrent connections. Furthermore, in various cases, any of such layers can be any suitable types of neural network layers having any suitable learnable or trainable internal parameters. For example, any of such input layer, one or more hidden layers, or output layer can be convolutional layers, whose learnable or trainable parameters can be convolutional kernels. As another example, any of such input layer, one or more hidden layers, or output layer can be dense layers, whose learnable or trainable parameters can be weight matrices or bias values. As still another example, any of such input layer, one or more hidden layers, or output layer can be batch normalization layers, whose learnable or trainable parameters can be shift factors or scale factors.

Further still, in various cases, any of such layers can be any suitable types of neural network layers having any suitable fixed or non-trainable internal parameters. For example, any of such input layer, one or more hidden layers, or output layer can be non-linearity layers, padding layers, pooling layers, or concatenation layers.

In various aspects, the object-agnostic segmentation model 404 can be configured to receive as input images that have the same format, size, or dimensionality as the image 104 and that are conditioned with user-provided inputs having the same format, size, or dimensionality as the user-provided input 402, and the object-agnostic segmentation model 404 can be configured to segment or localize as output the boundaries of generic objects that are depicted in those inputted images and that are characterized or called out by those user-provided inputs. That is, for any given image that depicts an object (whether or not that object belongs to the object class 108), there can be a user-provided input (e.g., positive or negative clicks, bounding box, text prompt) that somehow characterizes or calls out that object, and the object-agnostic segmentation model 404 can be configured to locate a boundary edge or boundary surface of that object.

In any case, the object-agnostic segmentation model 404 can be trained, as described herein, so as to learn how to segment or localize the boundaries of whatever objects are characterized or called out by respective user-provided inputs, regardless of whether such objects belong to the object class 108. Accordingly, the object-agnostic segmentation model 404 can be considered as not being specific or tailored to any object class, hence the term "object-agnostic".

In various embodiments, the object-agnostic component 120 can electronically segment or localize the inferred boundary 406, by executing the object-agnostic segmentation model 404 on the image 104 and on the user-provided input 402. Non-limiting aspects are described with respect to FIG. 5.

Figure 5:
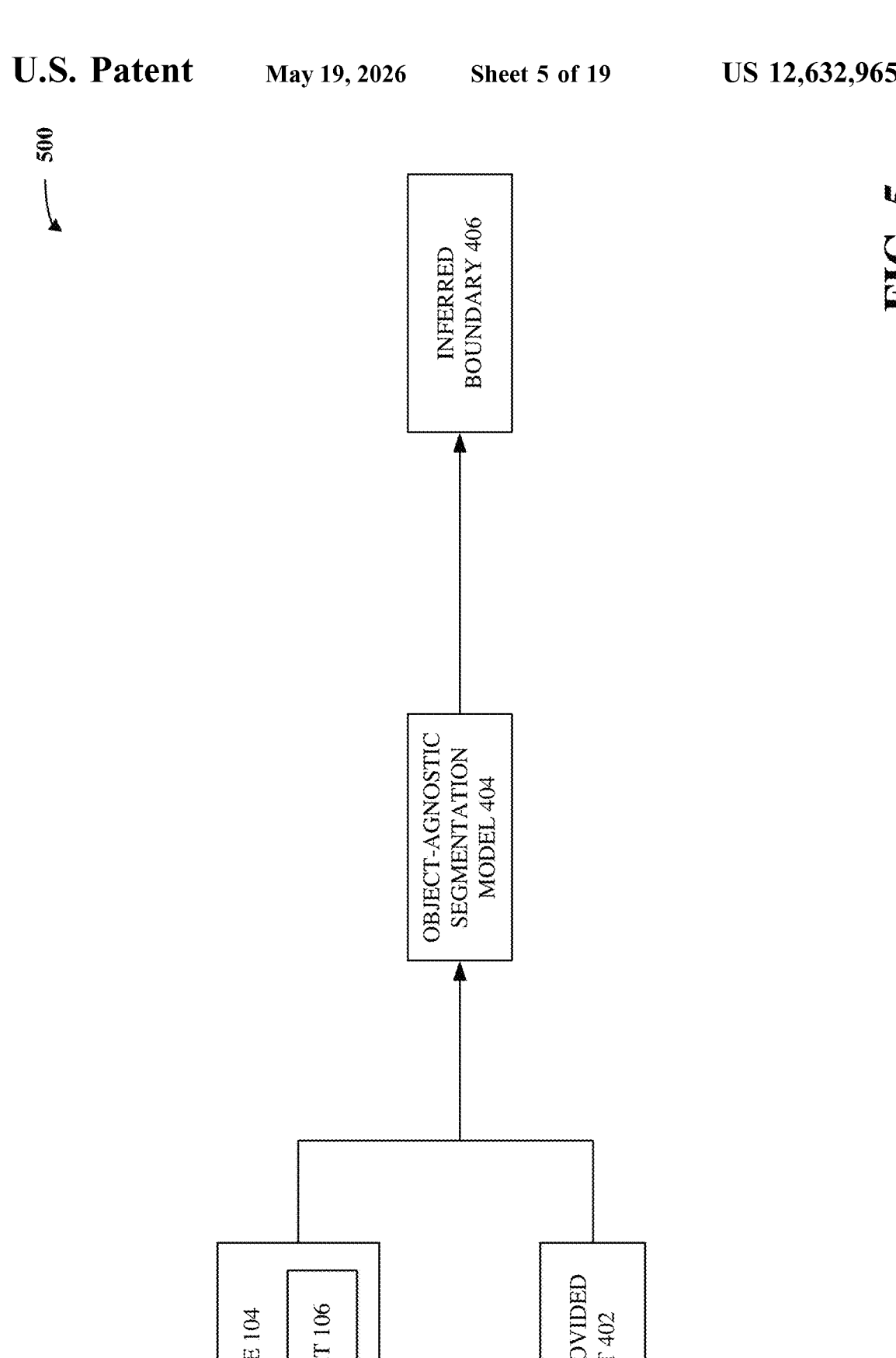
FIG. 5 illustrates an example, non-limiting block diagram showing how a second inferred object boundary can be generated via an object-agnostic segmentation model in accordance with one or more embodiments described herein.

FIG. 5 illustrates an example, non-limiting block diagram 500 showing how the inferred boundary 406 can be generated via the object-agnostic segmentation model 404 in accordance with one or more embodiments described herein.

In various aspects, the object-agnostic component 120 can electronically control or otherwise electronically operate the object-agnostic segmentation model 404. Accordingly, in various instances, the object-agnostic component 120 can electronically execute the object-agnostic segmentation model 404 on the image 104 and on the user-provided input 402. In various cases, such execution can cause the object-agnostic segmentation model 404 to segment, localize, or otherwise compute the inferred boundary 406. More specifically, the object-agnostic component 120 can concatenate the image 104 and the user-provided input 402 together. In various instances, the object-agnostic component 120 can feed that concatenation to an input layer of the object-agnostic segmentation model 404. In various aspects, that concatenation can complete a forward pass through one or more hidden layers of the object-agnostic segmentation model 404. In various instances, an output layer of the object-agnostic segmentation model 404 can compute or otherwise calculate the inferred boundary 406 based on activation maps generated by the one or more hidden layers of the object-agnostic segmentation model 404.

In any case, the inferred boundary 406 can be considered as being, indicating, conveying, or otherwise representing whatever portions of the image 104 that the object-agnostic segmentation model 404 believes or infers belong to the boundary of the object 106. Just as above, the inferred boundary 406 can be expressed in any suitable electronic format. As a non-limiting example, the inferred boundary 406 can be a segmentation mask that indicates which individual pixels or which individual voxels of the image 104 have been determined by the object-agnostic segmentation model 404 to belong to or otherwise make up the boundary of the object 106. Also just as above, the inferred boundary 406 can be considered as indicating or representing whatever the object-agnostic segmentation model 404 believes to be an external, circumferential, perimetral, or otherwise outermost edge or surface of the object 106.

Aside from being configured to receive different input data (e.g., being configured to receive the image 104 and the user-provided input 402, as opposed to being configured to receive just the image 104 by itself), note how the object-agnostic segmentation model 404 can functionally differ from the object-specific segmentation model 110. Indeed, the object-specific segmentation model 110 can have been previously trained to segment or localize boundaries of objects that belong to the object class 108. Accordingly, when the object-specific segmentation model 110 is executed on the image 104, the object-specific segmentation model 110 can be considered as searching for the boundary of whatever object depicted in the image 104 belongs to the object class 108. In contrast, when the object-agnostic segmentation model 404 is executed on the image 104 and on the user-provided input 402, the object-agnostic segmentation model 404 can be considered as not searching for the boundary whatever object depicted in the image 104 belongs to the object class 108. Instead, the object-agnostic segmentation model 404 can be considered as searching for whatever object boundary that it believes is characterized or called out by the user-provided input 402 (e.g., whatever object boundary is consistent with positive and negative clicks that the user has provided for the image 104, whatever object boundary is circumscribed by a bounding box that the user has provided for the image 104, whatever object boundary is described by a text prompt that the user has provided for the image 104).

Figure 6:
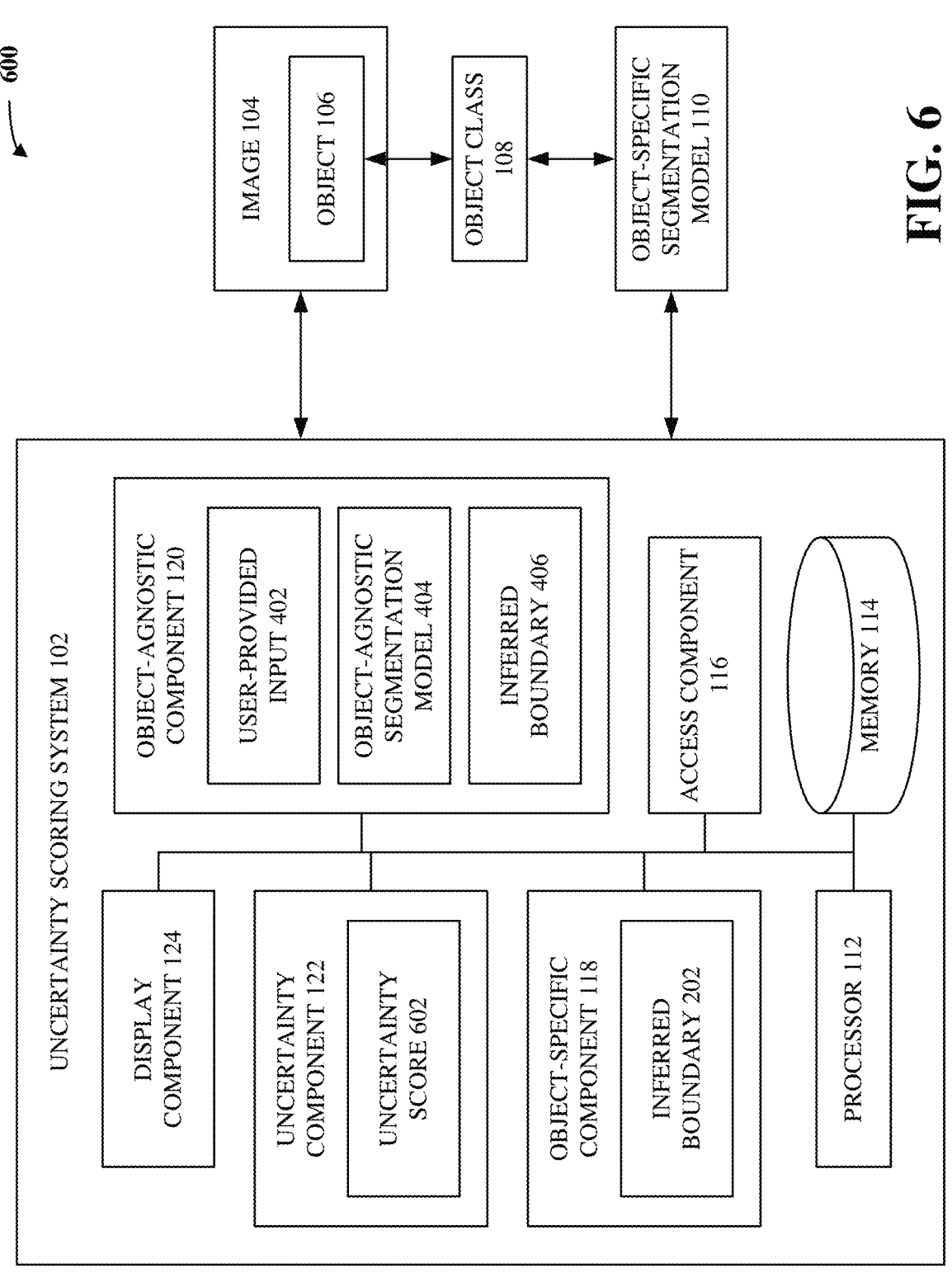
FIG. 6 illustrates a block diagram of an example, non-limiting system including an uncertainty score that facilitates improved uncertainty estimation via object-specific and object-agnostic segmentation disagreement in accordance with one or more embodiments described herein.

FIG. 6 illustrates a block diagram of an example, non-limiting system 600 including an uncertainty score that can facilitate improved uncertainty estimation via object-specific and object-agnostic segmentation disagreement in accordance with one or more embodiments described herein. As shown, the system 600 can, in some cases, comprise the same components as the system 400, and can further comprise an uncertainty score 602.

In various embodiments, the uncertainty component 122 can electronically generate the uncertainty score 602, based on the inferred boundary 202 and based on the inferred boundary 406. Non-limiting aspects are further described with respect to FIG. 7.

Figure 7:
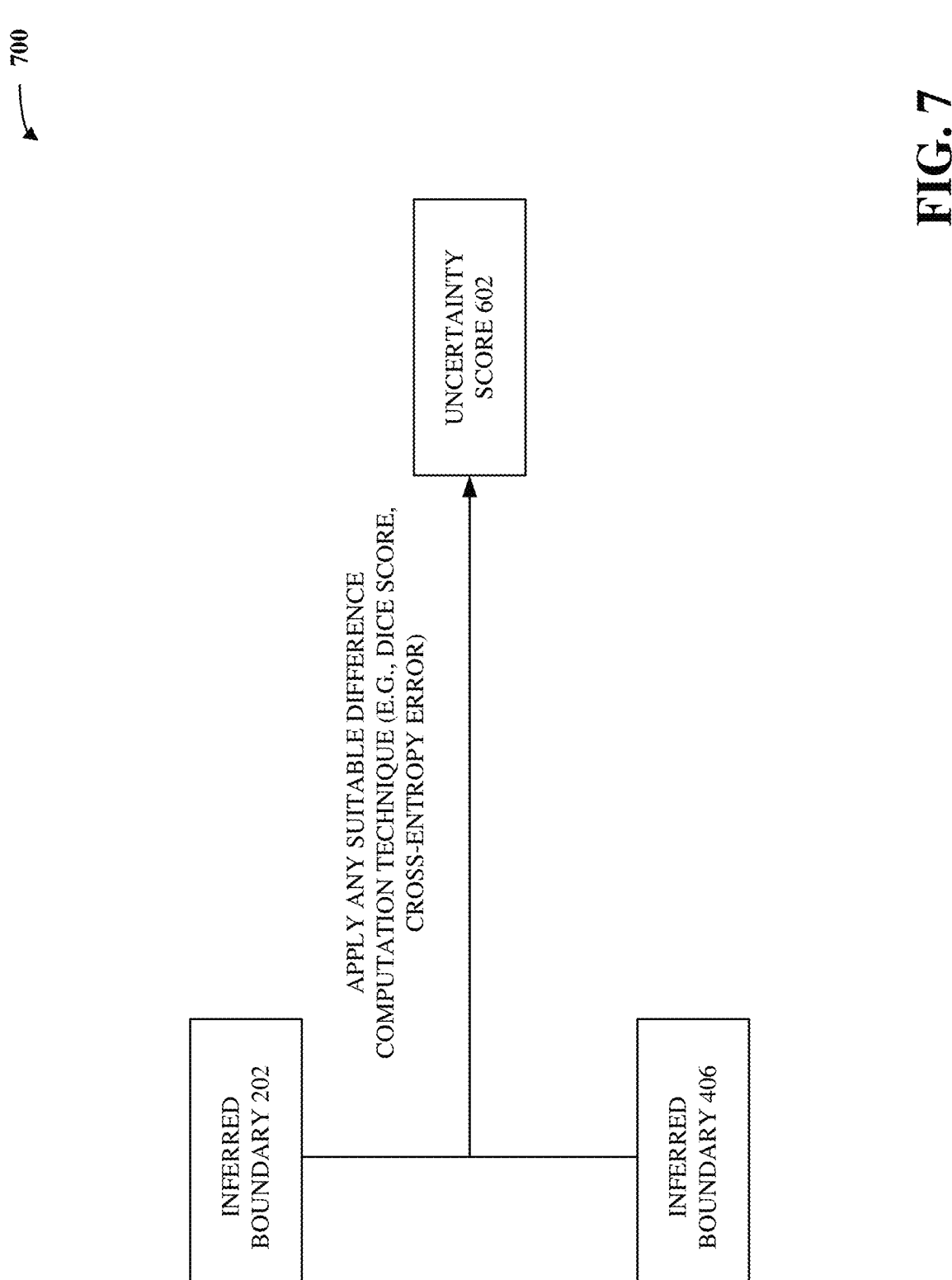
FIG. 7 illustrates an example, non-limiting block diagram showing how an uncertainty score can be generated from a first inferred object boundary and a second inferred object boundary in accordance with one or more embodiments described herein.

FIG. 7 illustrates an example, non-limiting block diagram 700 showing how the uncertainty score 602 can be generated from the inferred boundary 202 and from the inferred boundary 406 in accordance with one or more embodiments described herein.

In various embodiments, the uncertainty component 122 can electronically generate the uncertainty score 602 by comparing, in any suitable fashion, the inferred boundary 202 to the inferred boundary 406. More specifically, the uncertainty component 122 can electronically generate the uncertainty score 602 by applying any suitable difference computation technique or similarity computation technique to the inferred boundary 202 and to the inferred boundary 406. As a non-limiting example, the uncertainty component

122 can compute a Dice score between the inferred boundary 202 and the inferred boundary 406, and the uncertainty score 602 can be equal to or otherwise based on that Dice score (e.g., the uncertainty score 602 can be a function of that Dice score). As another non-limiting example, the uncertainty component 122 can compute a cross-entropy error between the inferred boundary 202 and the inferred boundary 406, and the uncertainty score 602 can be equal to or otherwise based on that cross-entropy error (e.g., the uncertainty score 602 can be any suitable function of that cross-entropy error). As yet another non-limiting example, the uncertainty component 122 can compute an MAE or MSE between the inferred boundary 202 and the inferred boundary 406, and the uncertainty score 602 can be equal to or otherwise based on that MAE or MSE (e.g., the uncertainty score 602 can be any suitable function of that MAE or MSE). In various aspects, the uncertainty score 602 can be normalized in any suitable fashion, so as to vary across any suitable range of real-valued scalars (e.g., from 0 to 1, from 0 to 10, from 0 to 100).

In any case, the uncertainty score 602 can be any suitable real-valued scalar whose magnitude can be considered as indicating how similar or how dissimilar the inferred boundary 202 is to the inferred boundary 406.

In some cases, larger magnitudes of the uncertainty score 602 can correspond to more uncertainty (e.g., to less similarity between the inferred boundary 202 and the inferred boundary 406). In such cases, as the magnitude of the uncertainty score 602 increases, it can be concluded that the inferred boundary 202 is less similar to (e.g., disagrees more with) the inferred boundary 406, and thus the inferred boundary 202 can be considered as having a higher amount of uncertainty (e.g., it can be concluded that the object-specific segmentation model 110 was inferenced on the image 104 with a higher amount of uncertainty or with a lower amount of confidence). In contrast, as the magnitude of the uncertainty score 602 decreases in such cases, it can instead be concluded that the inferred boundary 202 is more similar to (e.g., disagrees less with) the inferred boundary 406, and thus the inferred boundary 202 can be considered as having a lower amount of uncertainty (e.g., it can be concluded that the object-specific segmentation model 110 was inferenced on the image 104 with a lower amount of uncertainty or with a higher amount of confidence).

On the other hand, in various cases, smaller magnitudes of the uncertainty score 602 can correspond to more uncertainty (e.g., to less similarity between the inferred boundary 202 and the inferred boundary 406). In such cases, as the magnitude of the uncertainty score 602 decreases, it can be concluded that the inferred boundary 202 is less similar to (e.g., disagrees more with) the inferred boundary 406, and thus the inferred boundary 202 can be considered as having a higher amount of uncertainty (e.g., it can be concluded that the object-specific segmentation model 110 was inferenced on the image 104 with a higher amount of uncertainty or with a lower amount of confidence). In contrast, as the magnitude of the uncertainty score 602 increases in such cases, it can instead be concluded that the inferred boundary 202 is more similar to (e.g., disagrees less with) the inferred boundary 406, and thus the inferred boundary 202 can be considered as having a lower amount of uncertainty (e.g., it can be concluded that the object-specific segmentation model 110 was inferenced on the image 104 with a lower amount of uncertainty or with a higher amount of confidence).

In various aspects, the uncertainty component 122 can compare the uncertainty score 602 to any suitable threshold value (not shown). If the uncertainty score 602 satisfies that threshold value, the uncertainty component 122 can flag the inferred boundary 202 as sufficiently certain or confident. Instead, if the uncertainty score 602 fails to satisfy that threshold value, the uncertainty component 122 can flag the inferred boundary 202 as insufficiently certain or confident.

In various embodiments, the display component 124 can electronically render, on any suitable electronic display (e.g., computer screen, computer monitor), the uncertainty score 602. In various aspects, the display component 124 can electronically render the inferred boundary 202 or the inferred boundary 406 on the electronic display. Indeed, in some cases, the display component 124 can render the image 104 on the electronic display, and the display component 124 can render the inferred boundary 202 and the inferred boundary 406 (or any suitable graphical representations thereof) over top (e.g., superimposed on) the image 104, so that the inferred boundary 202 and the inferred boundary 406 can be visually compared by the user. In other cases, the display component 124 can render the image 104 on the electronic display, and the display component 124 can render a symmetric difference (e.g., non-overlapping regions) between the inferred boundary 202 and the inferred boundary 406 over top (e.g., superimposed on) the image 104, so that such symmetric difference (e.g., so such such non-overlapping regions) can be visually emphasized for the user. In this way, the user can get a visual sense of the disagreement, and thus the uncertainty, between the inferred boundary 202 and the inferred boundary 406.

FIGS. 8-13 illustrate, in example, non-limiting fashion, how various embodiments described herein can be applied to kidney ultrasound images.

Figure 8:
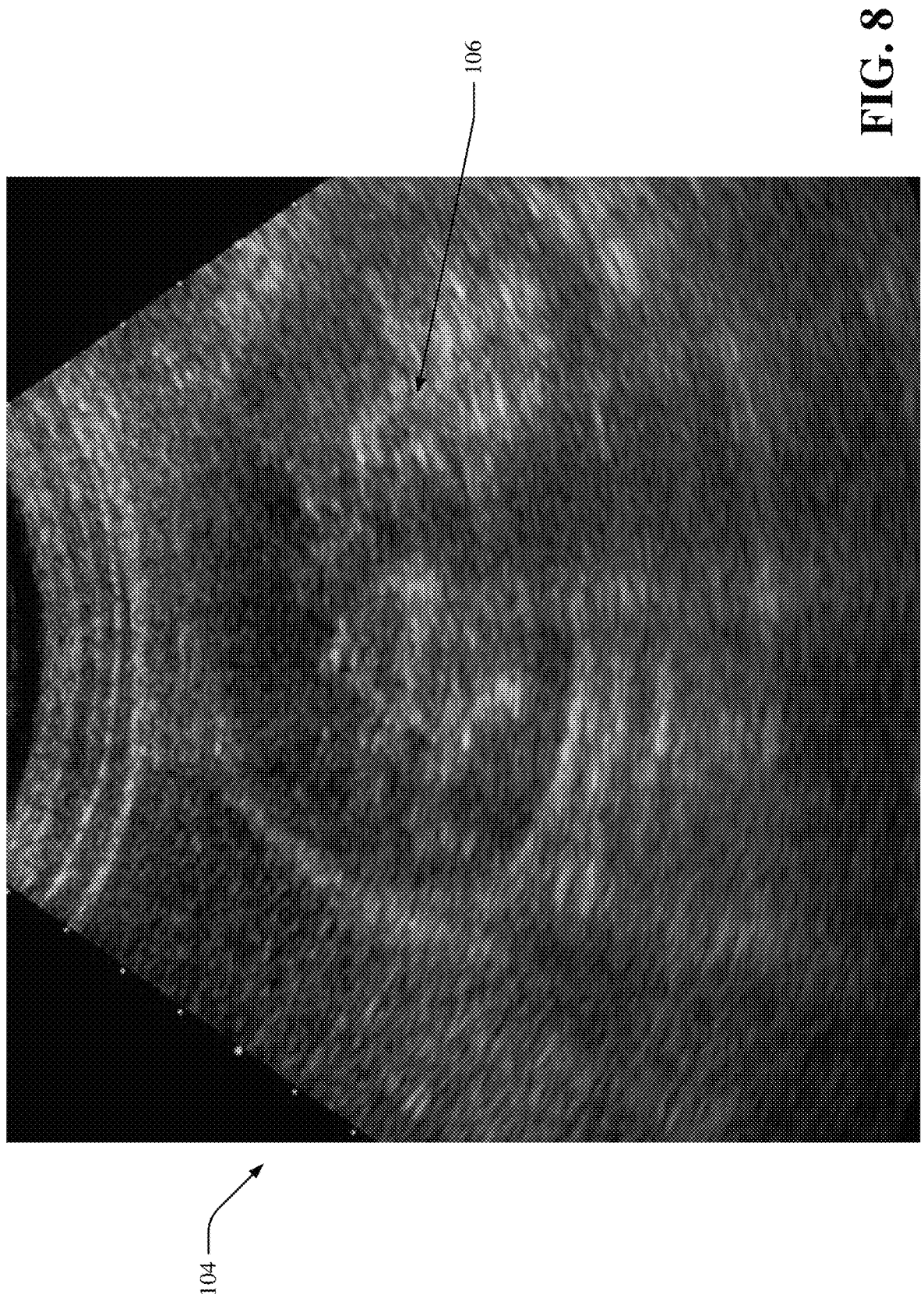
FIGS. 8-13 illustrate, in example, non-limiting fashion, how various embodiments described herein can be applied to kidney ultrasound images.

First, consider FIG. 8. As shown, FIG. 8 illustrates a non-limiting example embodiment in which the image 104 is an ultrasound scanned image, and in which the object 106 is a kidney depicted in that ultrasound scanned image. In other words, the object class 108 can be a kidney class. In still other words, the object-specific segmentation model 110 can have been previously trained to segment or localize the boundaries of kidneys that are depicted in inputted ultrasound scanned images.

Figure 9:
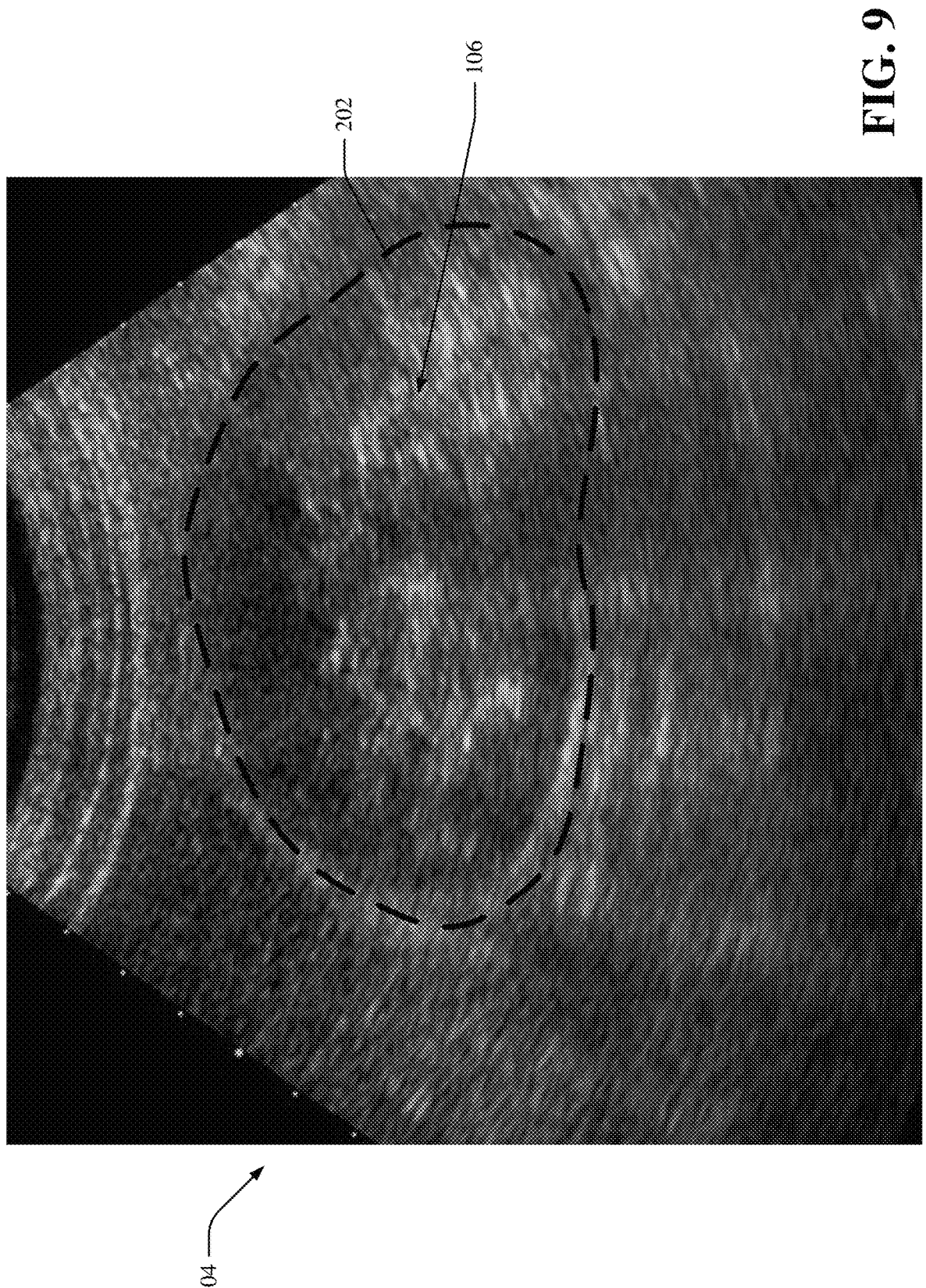

Now, consider FIG. 9. In various aspects, the object-specific segmentation model 110 can be executed on the image 104, thereby yielding the inferred boundary 202. Because the object 106 can be a kidney, the inferred boundary 202 can be considered as being whatever pixels of the image 104 that the object-specific segmentation model 110 believes or infers belong to the boundary of that kidney (e.g., the object-specification segmentation model 110 can be considered as having learned to search for kidney boundaries). A non-limiting graphical representation of that kidney boundary is shown in FIG. 9.

Figure 10:
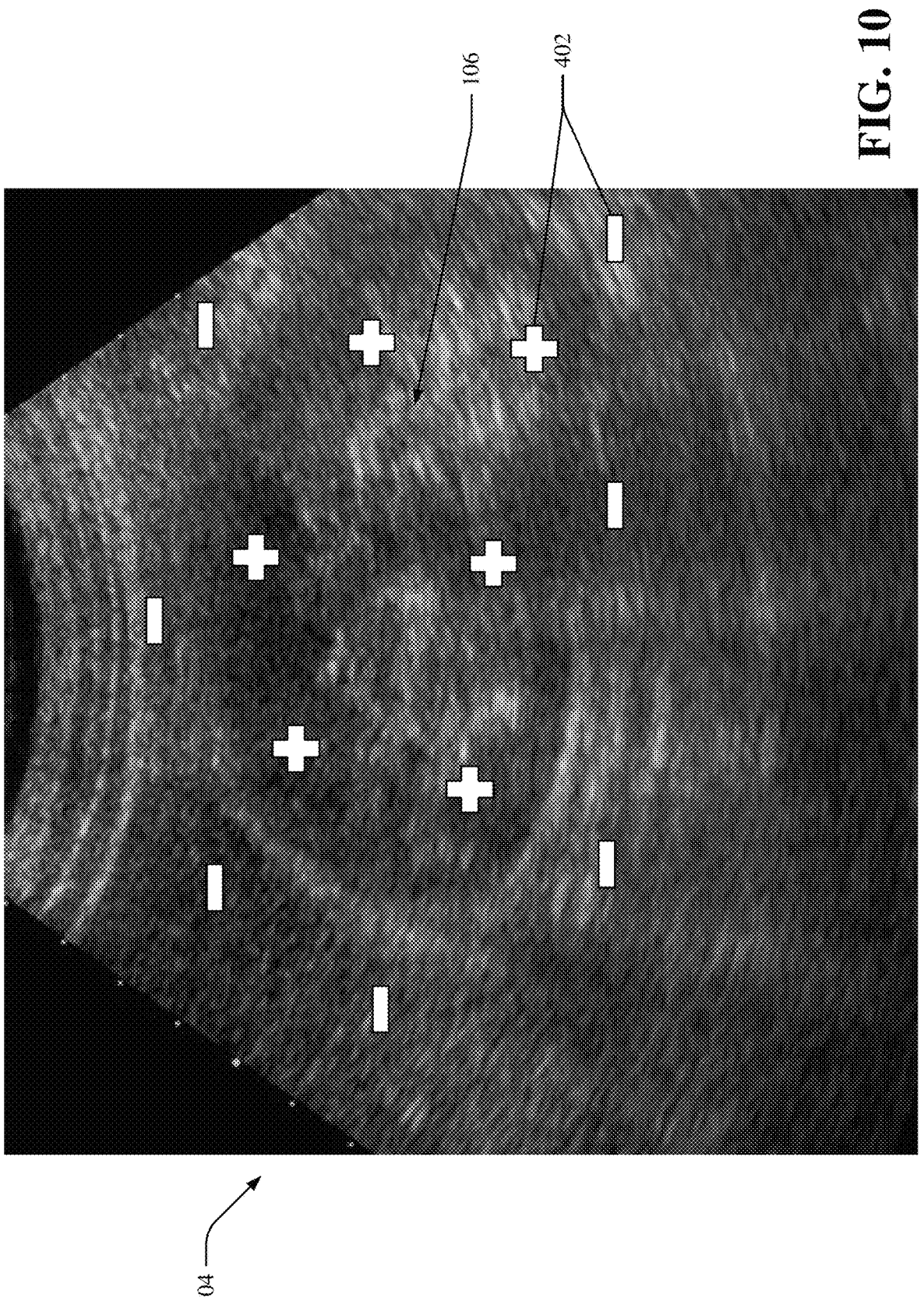

Next, consider FIG. 10. As shown, FIG. 10 illustrates a non-limiting example embodiment in which the user-provided input 402 comprises a set of positive clicks and a set of negative clicks. In particular, the set of positive clicks can respectively be or indicate locations within the image 104 that a user knows or deems to be part of the object 106 (e.g., part of the kidney) or that the user knows or deems to be otherwise inside of the boundary of the object 106 (e.g., inside of the kidney). For purposes of illustration, the set of positive clicks are graphically represented by plus-symbols (e.g., "+") in FIG. 10. Moreover, the set of negative clicks can respectively be or indicate locations within the image 104 that a user knows or deems to be not part of the object 106 (e.g., not part of the kidney) or that the user knows or deems to be otherwise outside of the boundary of the object

106 (e.g., outside of the kidney). For purposes of illustration, the set of negative clicks are graphically represented by minus-symbols (e.g., "−") in FIG. 10. However, this is a mere non-limiting example of the user-provided input 402. In other embodiments, as mentioned above, the user-provided input 402 could instead be a user-created bounding box that is known or deemed to circumscribe the object 106 (e.g., to circumscribe the kidney) or a user-created text prompt that is known or deemed to describe the object 106 (e.g., to describe the kidney).

Figure 11:
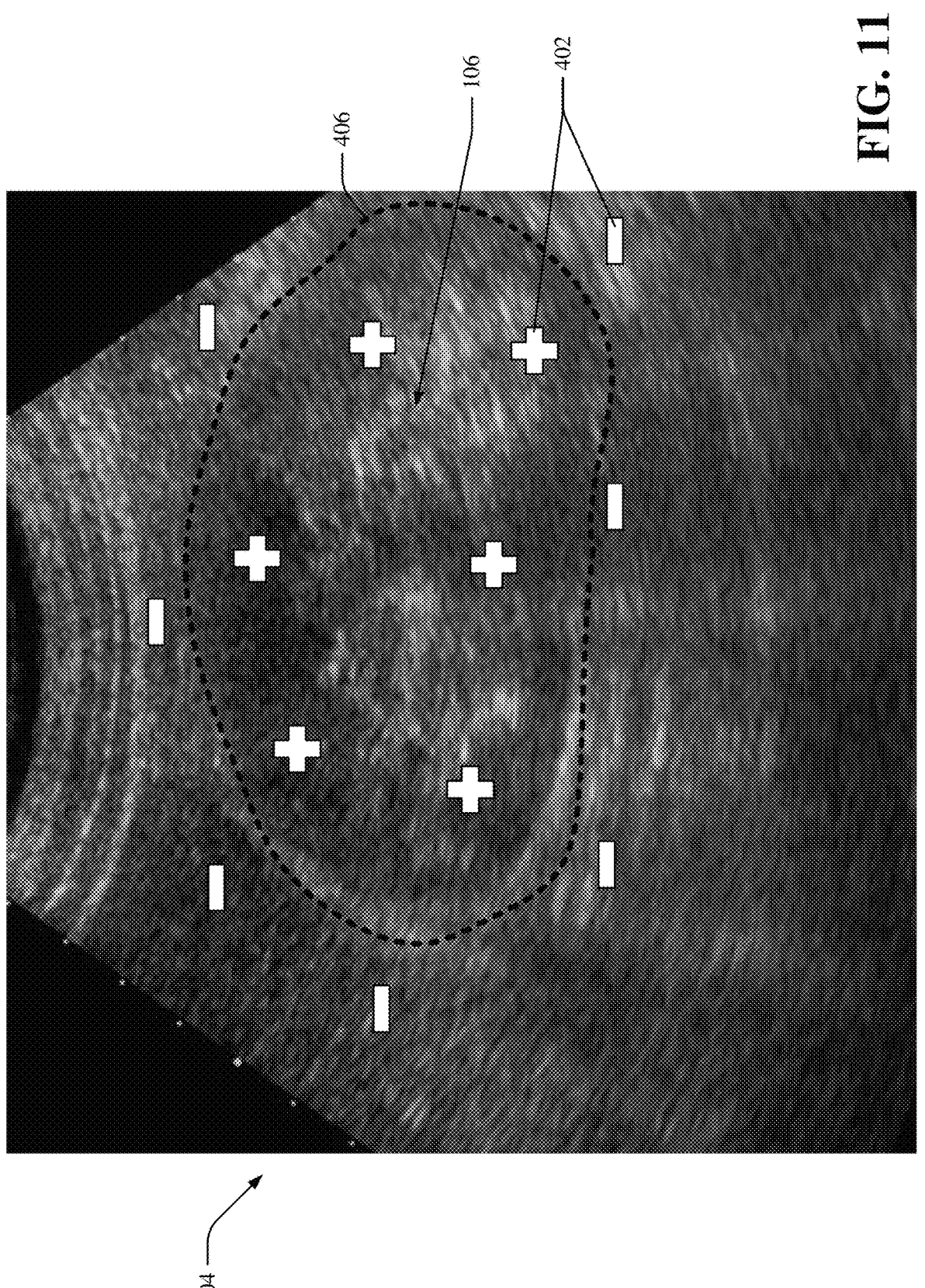

Now, consider FIG. 11. In various aspects, the object-agnostic segmentation model 404 can be executed on the image 104 and on the user-provided input 402 (e.g., the ultrasound scanned image, the set of positive clicks, and the set of negative clicks can be concatenated together, and the object-agnostic segmentation model 404 can be executed on that concatenation). Such execution can yield the inferred boundary 406. Note that the object-agnostic segmentation model 404 can be considered as not having learned to segment or localize kidney boundaries. Instead, the object-agnostic segmentation model 404 can be considered as having learned how to segment or localize the boundaries of whatever depicted, generic object is characterized or called out by a respective user-provided input. Thus, in various instances, the inferred boundary 406 can be considered as being whatever pixels of the image 104 that the object-agnostic segmentation model 404 believes or infers belong to the boundary of whatever object is characterized or called out by the user-provided input 402. Since the user-provided input 402 can characterize or call out the object 106 (e.g., the kidney), the inferred boundary 406 can be considered as the being whatever pixels of the image 104 that the object-agnostic segmentation model 404 believes or infers belong to the object 106 (e.g., belong to the kidney). A non-limiting graphical representation of that kidney boundary is shown in FIG. 11.

Figure 12:
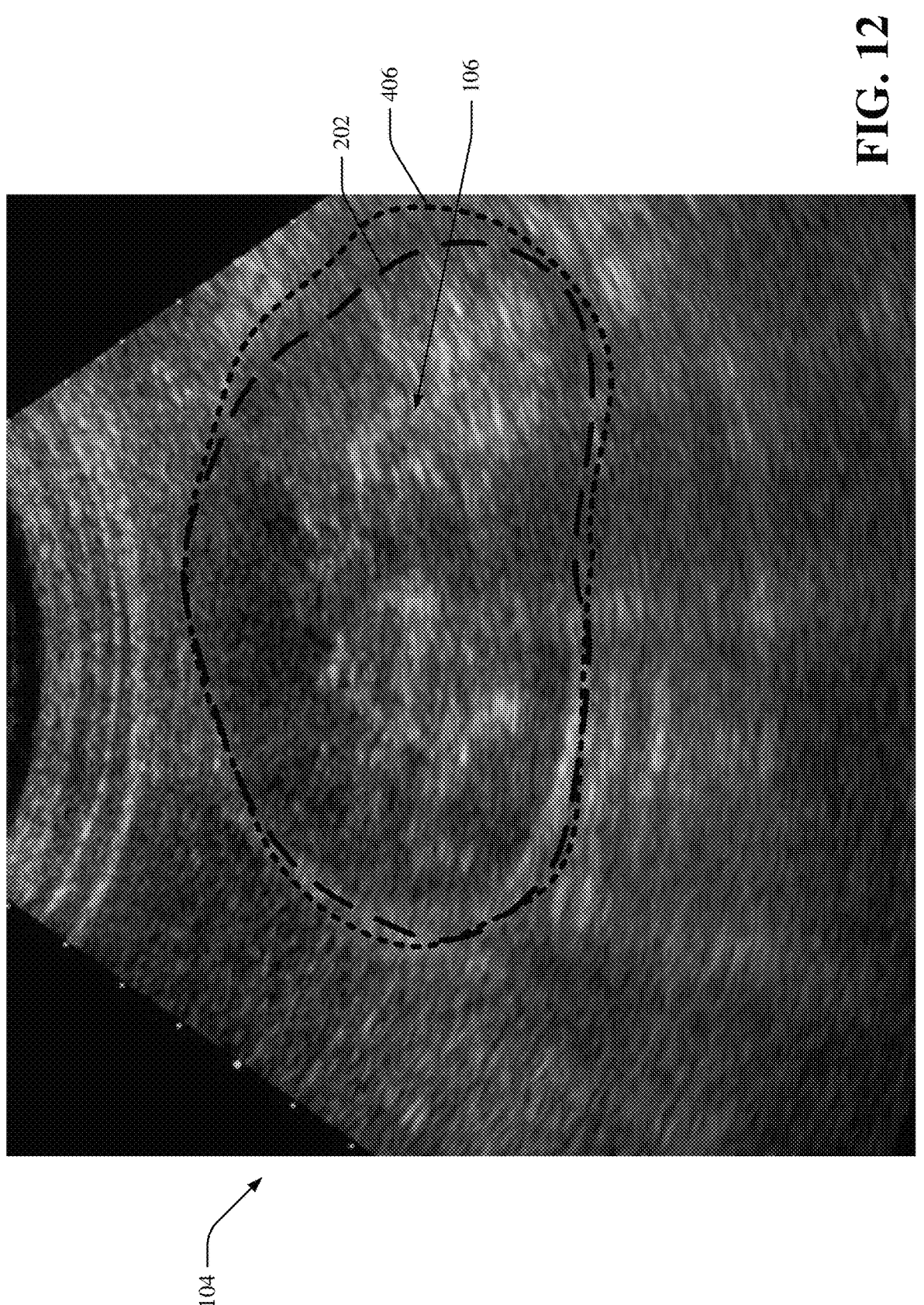

Next, consider FIG. 12. As mentioned above, the display component 124 can electronically superimpose the inferred boundary 202 and the inferred boundary 406 (or any suitable graphical representations thereof) over top of the image 104, so that the user can visually compare the inferred boundary 202 with the inferred boundary 406. A non-limiting example of such superimposition is shown in FIG. 12. Locations at which such boundaries do not match up can be considered as areas of disagreement or uncertainty.

Figure 13:
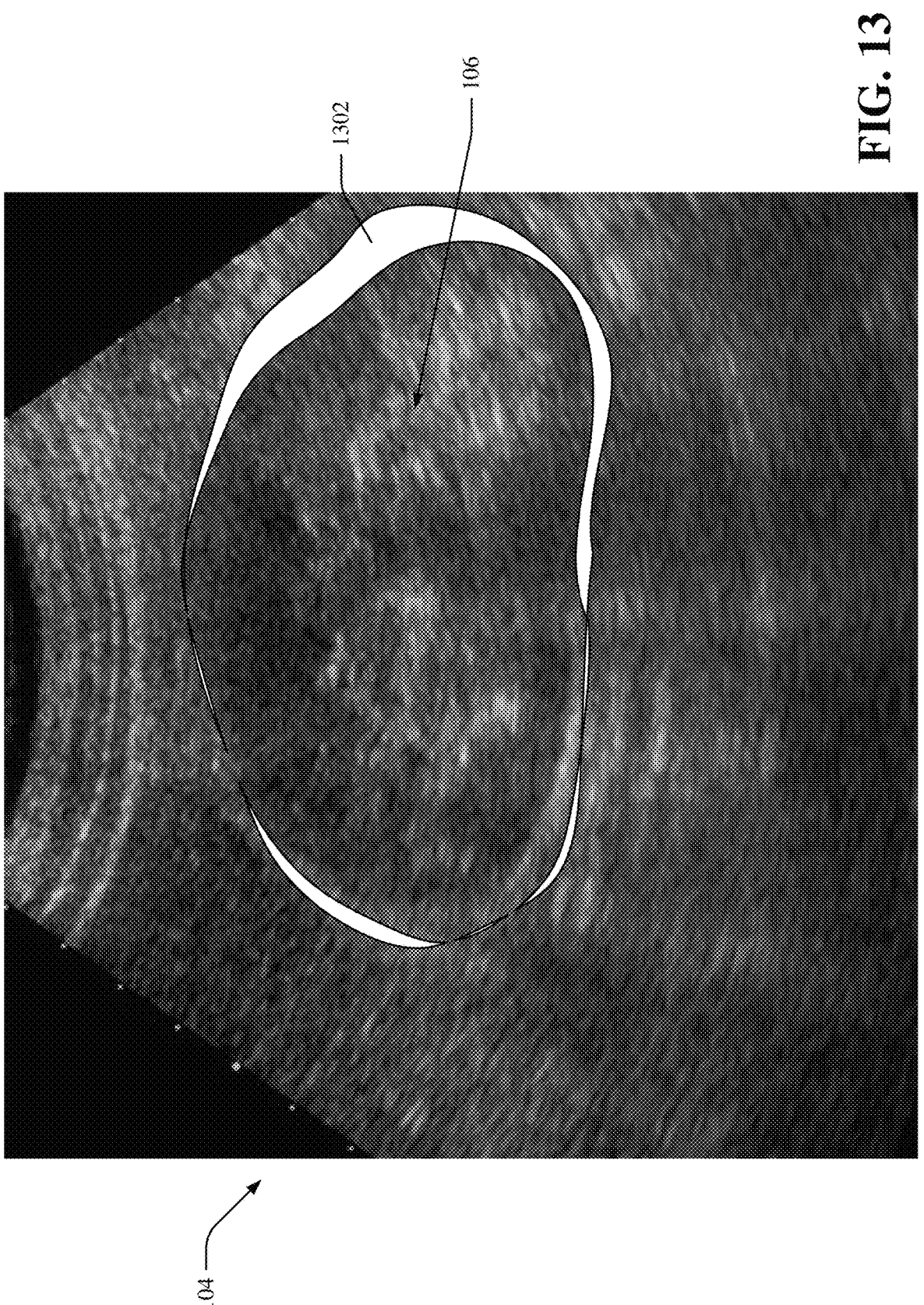

Now, consider FIG. 13. As mentioned above, the display component 124 can electronically compute a symmetric difference (e.g., one or more non-overlap regions) between the inferred boundary 202 and the inferred boundary 406, and the display component 124 can electronically superimpose that symmetric difference (or any suitable graphical representation thereof) over top of the image 104. This can provide even more visual emphasis to the specific locations or areas of disagreement (and thus uncertainty) between the inferred boundary 202 and the inferred boundary 406. A non-limiting example of such symmetric difference is shown in FIG. 13, via numeral 1302.

Figure 14:
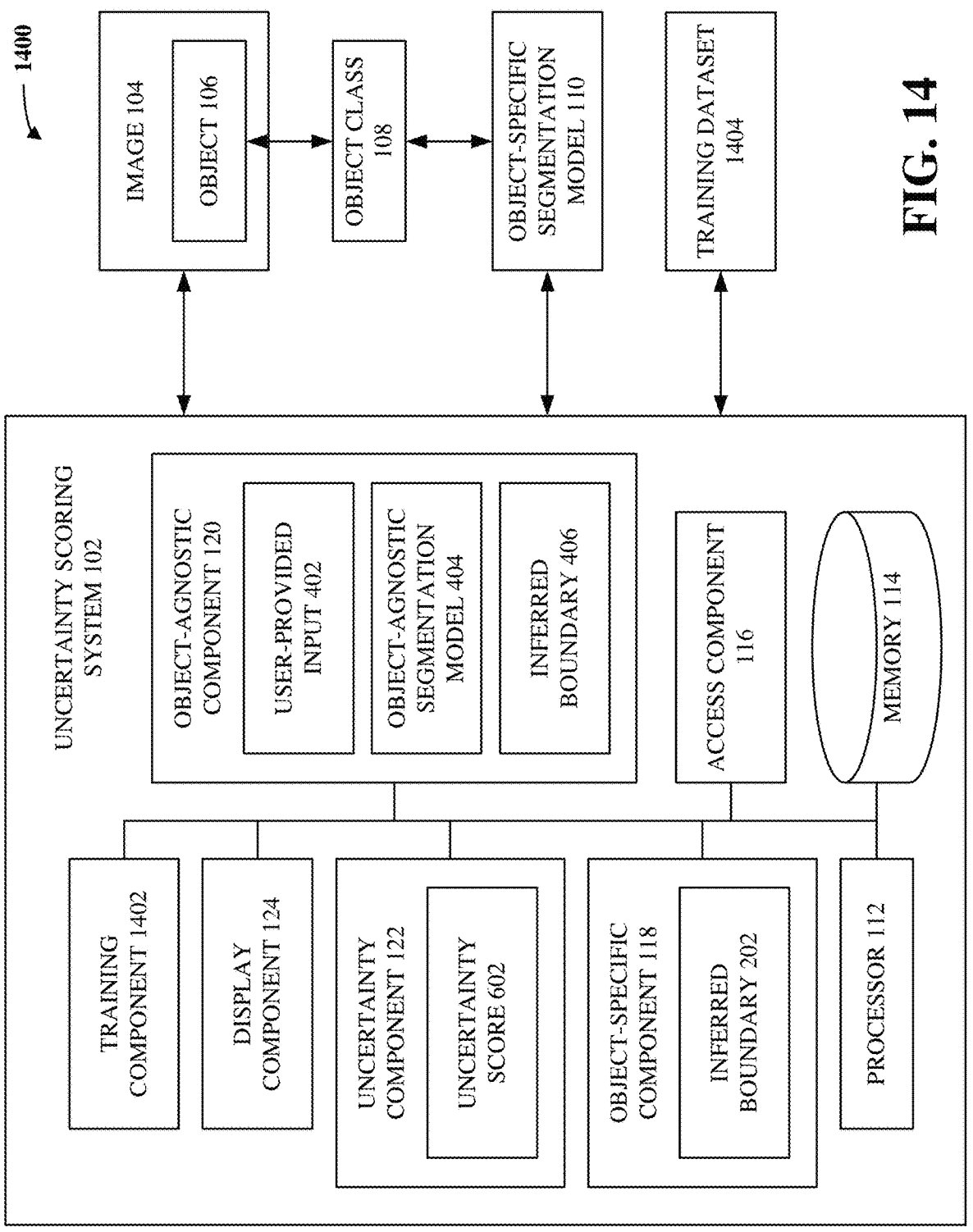
FIG. 14 illustrates a block diagram of an example, non-limiting system including a training component and a training dataset that facilitates improved uncertainty estimation via object-specific and object-agnostic segmentation disagreement in accordance with one or more embodiments described herein.
Figure 15:
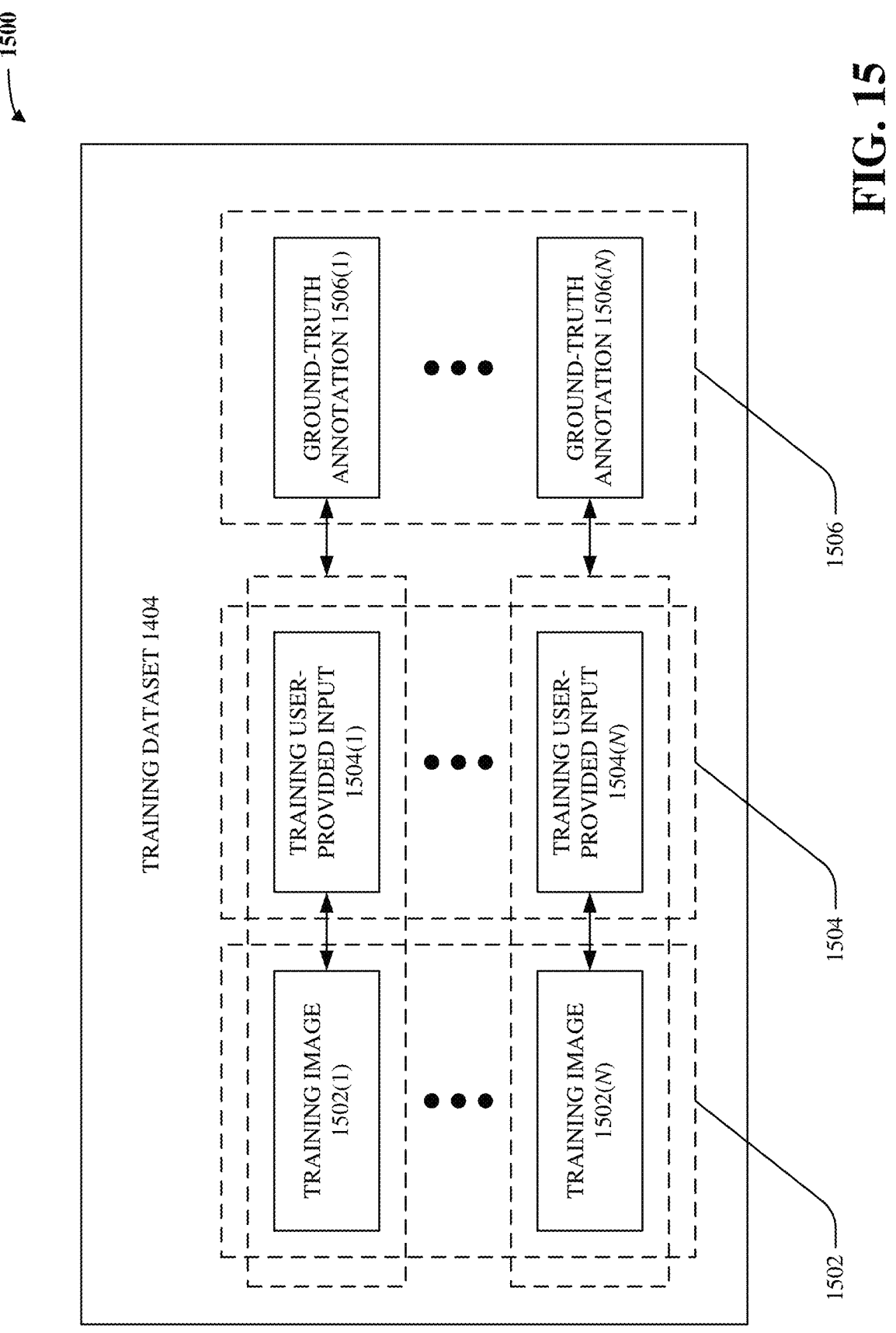
FIG. 15 illustrates an example, non-limiting block diagram of a training dataset in accordance with one or more embodiments described herein.
Figure 16:
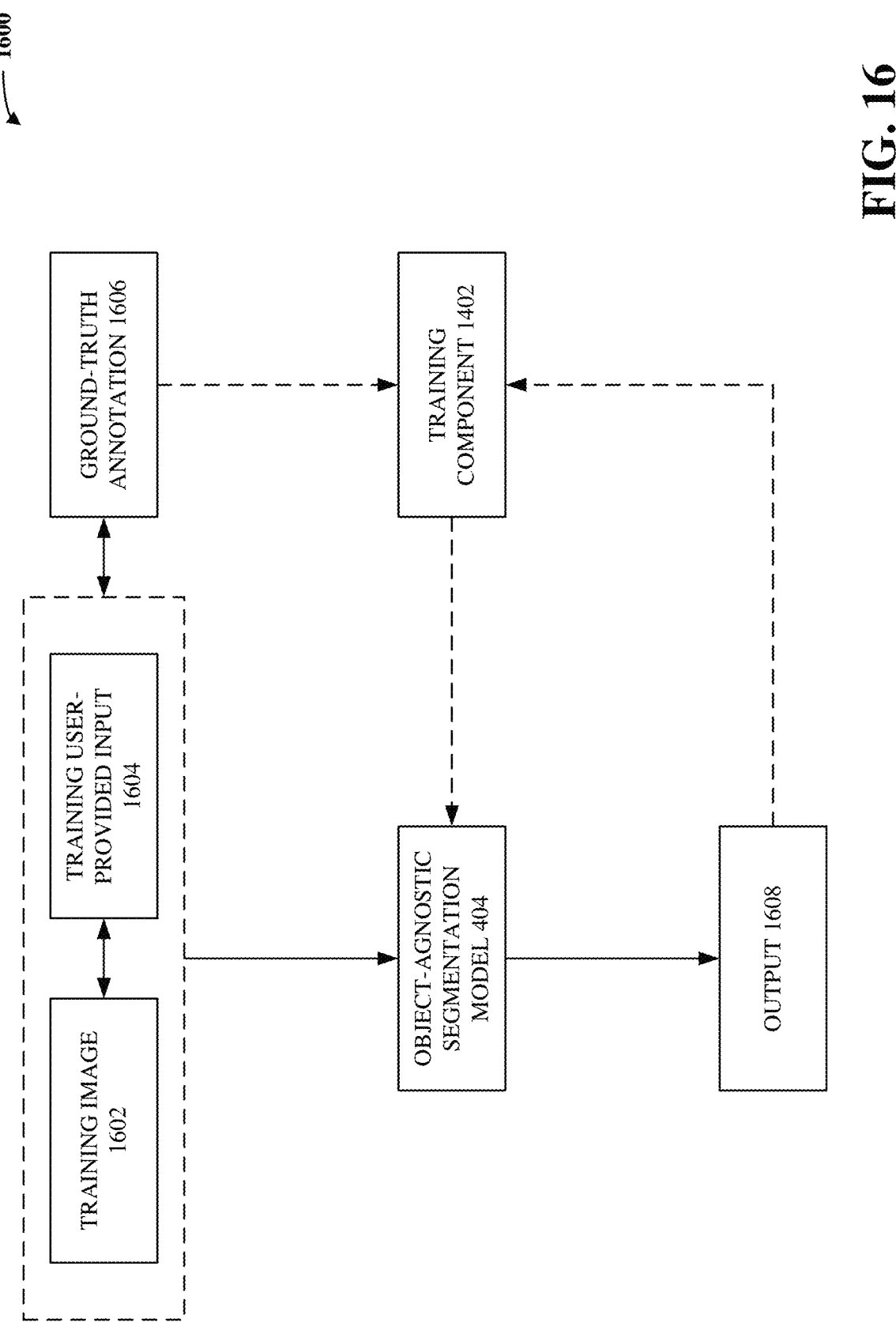
FIG. 16 illustrates an example, non-limiting block diagram showing how an object-agnostic segmentation model can be trained in accordance with one or more embodiments described herein.

In order for the inferred boundary 406, and thus the uncertainty score 602, to be accurate or reliable, the object-agnostic segmentation model 404 can first undergo training, as described with respect to FIGS. 14-16.

FIG. 14 illustrates a block diagram of an example, non-limiting system 1400 including a training component and a training dataset that can facilitate improved uncertainty estimation via object-specific and object-agnostic segmentation disagreement in accordance with one or more embodiments described herein. As shown, the system 1400 can, in various cases, comprise the same components as the system 600, and can further comprise a training component 1402 and a training dataset 1404.

In various embodiments, the access component 116 can electronically receive, retrieve, or otherwise access, from any suitable source, the training dataset 1404. In various aspects, the training component 1402 can train the object-agnostic segmentation model 404 on the training dataset 1404. Non-limiting aspects of such training are described with respect to FIGS. 15-16.

FIG. 15 illustrates an example, non-limiting block diagram 1500 of the training dataset 1404 in accordance with one or more embodiments described herein.

As shown, the training dataset 1404 can comprise a set of training images 1502. In various aspects, the set of training images 1502 can comprise n images for any suitable positive integer n: a training image 1502(1) to a training image 1502 (*n*). In various instances, each of the set of training images 1502 can be an image that exhibits the same format, size, or dimensionality as the image 104 and that depicts a respective generic object (e.g., an object that may or may not belong to the object class 108). As a non-limiting example, the training image 1502(1) can be a first image having the same number and arrangement of pixels or voxels as the image 104 and depicting a first generic object. As another non-limiting example, the training image **1502(*n*) can be an n-th image having the same number and arrangement of pixels or voxels as the image 104** and depicting an n-th generic object.

In various aspects, as shown, the training dataset 1404 can comprise a set of training user-provided inputs 1504. In various instances, the set of training user-provided inputs 1504 can respectively correspond (e.g., in one-to-one fashion) to the set of training images 1502. Accordingly, since the set of training images 1502 can comprise n images, the set of training user-provided inputs 1504 can comprise n inputs: a training user-provided input 1504(1) to a training user-provided input **1504(*n*). In various cases, each of the set of training user-provided inputs 1504 can exhibit the same format, size, or dimensionality as the user-provided input 402 and can characterize or otherwise call out whatever generic object is depicted in a respective one of the set of training images 1502**.

As a non-limiting example, the training user-provided input 1504(1) can correspond to the training image 1502(1). Since the training image 1502(1) can depict a first generic object, the training user-provided input 1504(1) can characterize or otherwise call out that first generic object. For instance, if the user-provided input 402 comprises positive and negative clicks respectively indicating locations within the image 104 that are known to be inside or outside of the object 106, then the training user-provided input 1504(1) can comprise positive and negative clicks respectively indicating locations within the training image 1502(1) that are known to be inside or outside of the first generic object. In another instance, if the user-provided input 402 comprises a bounding box within the image 104 that is known to circumscribe the object 106, then the training user-provided input 1504(1) can comprise a bounding box within the training image 1502(1) that is known to circumscribe the first generic object. In yet another instance, if the user-provided input 402 comprises a text prompt that describes the object 106, then the training user-provided input 1504(1) can comprise a text prompt that describes the first generic object.

As another non-limiting example, the training user-provided input **1504(*n*)** can correspond to the training image

**1502(*n*). Since the training image 1502(*n*) can depict an n-th generic object, the training user-provided input 1504(*n*) can characterize or otherwise call out that n-th generic object. For instance, if the user-provided input 402 comprises positive and negative clicks respectively indicating locations within the image 104 that are known to be inside or outside of the object 106, then the training user-provided input 1504(*n*) can comprise positive and negative clicks respectively indicating locations within the training image 1502(*n*) that are known to be inside or outside of the n-th generic object. In another instance, if the user-provided input 402 comprises a bounding box within the image 104 that is known to circumscribe the object 106, then the training user-provided input 1504(*n*) can comprise a bounding box within the training image 1502(*n*) that is known to circumscribe the n-th generic object. In yet another instance, if the user-provided input 402 comprises a text prompt that describes the object 106, then the training user-provided input 1504(*n*)** can comprise a text prompt that describes the n-th generic object.

In various aspects, as shown, the training dataset 1404 can comprise a set of ground-truth annotations 1506. In various instances, the set of ground-truth annotations 1506 can respectively correspond (e.g., in one-to-one fashion) to the set of training images 1502 and to the set of training user-provided inputs 1504. Accordingly, since the set of training images 1502 can comprise n images, and since the set of training user-provided inputs 1504 can comprise n inputs, the set of ground-truth annotations can comprise n annotations: a ground-truth annotation 1506(1) to a ground-truth annotation **1506(*n*). In various cases, each of the set of ground-truth annotations 1506 can be considered as a correct or accurate boundary segmentation or localization that is known or deemed to correspond to a respective one of the set of training images 1502 and to a respective one of the set of training user-provided inputs 1504**.

As a non-limiting example, the ground-truth annotation 1506(1) can correspond to the training image 1502(1) and to the training user-provided input 1504(1). Accordingly, the ground-truth annotation 1506(1) can be considered as being, indicating, or otherwise representing a correct or accurate boundary of the first generic object that is depicted in the training image 1502(1) and that is characterized or called out by the training user-provided input 1504(1). As another non-limiting example, the ground-truth annotation **1506(*n*) can correspond to the training image 1502(*n*) and to the training user-provided input 1504(*n*). Accordingly, the ground-truth annotation 1506(*n*) can be considered as being, indicating, or otherwise representing a correct or accurate boundary of the n-th generic object that is depicted in the training image 1502(*n*) and that is characterized or called out by the training user-provided input 1504(*n*)**.

FIG. 16 illustrates an example, non-limiting block diagram 1600 showing how the object-agnostic segmentation model 404 can be trained on the training dataset 1404 in accordance with one or more embodiments described herein.

In various embodiments, prior to beginning training, the training component 1402 can electronically initialize the trainable internal parameters (e.g., weight matrices, bias values, convolutional kernels) of the object-agnostic segmentation model 404 in any suitable fashion (e.g., random initialization).

In various aspects, the training component 1402 can electronically select any training image, corresponding training user-provided input, and corresponding ground-truth annotation from the training dataset 1404. These can respectively be referred to as a training image 1602, a training user-provided input 1604, and a ground-truth annotation 1606.

In various instances, the training component 1402 can execute the object-agnostic segmentation model 404 on both the training image 1602 and the training user-provided input 1604. In various instances, this can cause the object-agnostic segmentation model 404 to produce an output 1608. More specifically, the training component 1402 can concatenate the training image 1602 and the training user-provided input 1604 together. In various instances, the training component 1402 can feed that concatenation to the input layer of the object-agnostic segmentation model 404. In various cases, that concatenation can complete a forward pass through the one or more hidden layers of the object-agnostic segmentation model 404. Accordingly, the output layer of the object-agnostic segmentation model 404 can compute or calculate the output 1608 based on activation maps produced by the one or more hidden layers of the object-agnostic segmentation model 404.

Note that, in various cases, the format, size, or dimensionality of the output 1608 can be controlled or otherwise determined by the number, arrangement, or sizes of neurons or other internal parameters (e.g., convolutional kernels) that are contained in or that otherwise make up the output layer of the object-agnostic segmentation model 404. Thus, the output 1608 can be forced to have any desired format, size, or dimensionality by adding, removing, or otherwise adjusting neurons or other internal parameters to, from, or within the output layer of the object-agnostic segmentation model 404.

In any case, the output 1608 can be considered as being an inferred or predicted boundary segmentation or localization for whatever generic object is depicted in the training image 1602 and characterized or called out by the training user-provided input 1604. In contrast, the ground-truth annotation 1606 can be considered the correct or accurate boundary segmentation or localization for that generic object. Note that, if the object-agnostic segmentation model 404 has so far undergone no or little training, then the output 1608 can be highly inaccurate (e.g., the output 1608 can be very different from the ground-truth annotation 1606).

In various aspects, the training component 1402 can compute an error or loss (e.g., MAE, MSE, cross-entropy) between the output 1608 and the ground-truth annotation 1606. In various instances, as shown, the training component 1402 can incrementally update the trainable internal parameters of the object-agnostic segmentation model 404, by performing backpropagation (e.g., stochastic gradient descent) driven by the computed error or loss.

In various cases, the training component 1402 can repeat the above-described training procedure for any suitable number of training images (e.g., for all of the training images in the training dataset 1404). This can ultimately cause the trainable internal parameters of the object-agnostic segmentation model 404 to become iteratively optimized for accurately segmenting or localizing generic object boundaries, based on inputted images conditioned with user-provided inputs. In various aspects, the training component 1402 can implement any suitable training batch sizes, any suitable training termination criterion, or any suitable error, loss, or objective function when training the object-agnostic segmentation model 404.

Although the herein disclosure has mainly described how the object-agnostic segmentation model 404 can be trained in a supervised fashion, this is a mere non-limiting example. In various other embodiments, the object-agnostic segmentation model 404 can instead be trained in any other suitable fashion (e.g., via unsupervised learning, via reinforcement learning).

Various embodiments are described herein in which the object-agnostic segmentation model 404 is configured to generate the inferred boundary 406 based on the image 104 and based on the user-provided input 402 (e.g., the user-provided input 402 can be positive/negative clicks, a bounding box, or a text prompt that calls out the object 106). However, it is to be understood that these are mere non-limiting examples of the object-agnostic segmentation model 404. Indeed, in various aspects, the object-agnostic segmentation model 404 can be configured to generate the inferred boundary 406 based on the image 104 and based on any suitable supplemental data that calls out the object 106, whether or not that supplemental data is provided by a user of the uncertainty scoring system 102. In such cases, the user-provided input 402 can thus be replaced with "supplemental input," and the set of training user-provided inputs 1504 can be replaced with "a set of training supplemental inputs".

As a non-limiting example, a supplemental input can be a collection of positive clicks or negative clicks that respectively denote intra-image locations that are inside or outside the desired object, where such positive clicks or negative clicks can be automatically generated by the object-agnostic component 120 based on the inferred boundary 202 (e.g., the localized boundary inferred by the object-specific segmentation model 110) rather than being provided by the user. For instance, the object-agnostic component 120 can select (e.g., at random) 21 intra-image locations that are inside of the inferred boundary 202, for any suitable positive integer $z_1$, and such $z_1$ selected locations can be treated like positive clicks, despite the fact that such $z_1$ intra-image locations can be selected without user intervention (e.g., such $z_1$ selected locations can be referred to as positive pseudo-clicks). Likewise, the object-agnostic component 120 can select (e.g., at random) $z_2$ intra-image locations that are outside of the inferred boundary 202, for any suitable positive integer $z_2$, and such $z_2$ selected locations can be treated like negative clicks, despite the fact that such $z_2$ intra-image locations can be selected without user intervention (e.g., such $z_2$ selected locations can be referred to as negative pseudo-clicks).

As another non-limiting example, a supplemental input can be a bounding box that is deemed to circumscribe the desired object, where such bounding box can be automatically generated by the object-agnostic component 120 based on the inferred boundary 202 (e.g., the localized boundary inferred by the object-specific segmentation model 110) rather than being provided by the user. For instance, the object-agnostic component 120 can generate a bounding box of any suitable size that circumscribes the inferred boundary 202. In particular, the object-agnostic component 120 can cause the edges of the bounding box to be any suitable threshold distance from the inferred boundary 202.

In some embodiments, the object-agnostic segmentation model 404 can be configured to operate in the absence of any supplemental input whatsoever. As a non-limiting example, the object-agnostic segmentation model 404 can be configured to localize the boundaries of all plausible, visible, or detectable objects within the image 104, and the inferred boundary 406 can be whichever one of those localized boundaries is closest or most similar to the inferred boundary 202. In such cases, the user-provided input 402 can be omitted, the set of training user-provided inputs 1504 can be omitted, and each of the set of ground-truth annotations 1506 can be considered as indicating the correct or accurate boundary segmentations or localizations for all objects that are known or deemed to be plausible, visible, or detectable in a respective one of the set of training images 1502.

FIG. 17 illustrates a flow diagram of an example, non-limiting computer-implemented method 1700 that can facilitate improved uncertainty estimation via object-specific and object-agnostic segmentation disagreement in accordance with one or more embodiments described herein. In various cases, the uncertainty scoring system 102 can facilitate the computer-implemented method 1700.

In various embodiments, act 1702 can include accessing, by a device (e.g., via 116) operatively coupled to a processor (e.g., 112), an image (e.g., 104) depicting an object (e.g., 106).

In various aspects, act 1704 can include localizing, by the device (e.g., via 118) and via execution of an object-specific segmentation model (e.g., 110) on the image, a first inferred boundary (e.g., 202) of the object.

In various instances, act 1706 can include generating, by the device (e.g., via 122), an uncertainty score (e.g., 602) for the first inferred boundary, based on a second inferred boundary (e.g., 406) of the object generated via execution of an object-agnostic segmentation model (e.g., 404) on the image.

In various cases, act 1708 can include initiating, by the device (e.g., 102), one or more electronic actions, in response to the uncertainty score failing to satisfy any suitable threshold. As a non-limiting example, this can include transmitting, by the device (e.g., 102) and to any suitable computing device, an electronic notification that specifies or recommends that the object-specific segmentation model undergo retraining, refinement, or finetuning. As another non-limiting example, this can include actually performing or facilitating, by the device (e.g., 102), such retraining, refinement, or finetuning of the object-specific segmentation model. As even another non-limiting example, this can include transmitting, by the device (e.g., 102) and to any suitable computing device, an electronic notification that specifies or recommends that the image be manually reviewed by a technician or subject matter expert. These are mere non-limiting examples. In various aspects, the uncertainty score can be leveraged or otherwise utilized for any other suitable purposes or to trigger any other suitable electronic actions.

Although not explicitly shown in FIG. 17, the object-agnostic segmentation model can be a click-based segmentation model, and the computer-implemented method 1700 can further comprise: receiving or generating, by the device (e.g., via 120), a set of positive clicks (e.g., part of 402) inside the object and a set of negative clicks (e.g., part of 402) outside the object; and executing, by the device (e.g., via 120), the object-agnostic segmentation model on the image, on the set of positive clicks, and on the set of negative clicks, thereby yielding the second inferred boundary.

Although not explicitly shown in FIG. 17, the object-agnostic segmentation model can be a bounding-box-based segmentation model, and the computer-implemented method 1700 can further comprise: receiving or generating, by the device (e.g., via 120), a bounding box (e.g., part of 402) circumscribing the object; and executing, by the device (e.g., via 120), the object-agnostic segmentation model on the image and on the bounding box, thereby yielding the second inferred boundary.

Although not explicitly shown in FIG. 17, the object-agnostic segmentation model can be a text-prompt-based segmentation model, and the computer-implemented method 1700 can further comprise: receiving, by the device (e.g., via 120) and from a user, a text prompt (e.g., part of 402) describing the object; and executing, by the device, the object-agnostic segmentation model on the image and on the text prompt, thereby yielding the second inferred boundary.

Although not explicitly shown in FIG. 17, the computer-implemented method 1700 can comprise: executing, by the device (e.g., via 120), the object-agnostic segmentation model on the image, wherein the object-agnostic segmentation model can localize multiple inferred boundaries of multiple objects depicted in the image, and wherein the second inferred boundary can be whichever of the multiple inferred boundaries is closest, nearest, or most similar to the first inferred boundary.

Although not explicitly shown in FIG. 17, the computer-implemented method 1700 can comprise: visually rendering, by the device, on an electronic display: both the first inferred boundary and the second inferred boundary; or one or more non-overlap regions (e.g., 1302) between the first inferred boundary and the second inferred boundary.

Although not explicitly shown in FIG. 17, the image can be an X-ray image, a computed tomography image, a magnetic resonance image, an ultrasound image, or a positron emission tomography image of a medical patient, and the object can be an anatomical structure (e.g., kidney) of the medical patient.

In various aspects, various embodiments described herein can be implemented as a computer program product for facilitating improved uncertainty estimation via object-specific and object-agnostic segmentation disagreement. In various instances, the computer program product can comprise a computer-readable memory (e.g., 114) having program instructions embodied therewith. In various cases, the program instructions can be executable by a processor (e.g., 112) to cause the processor to: access a medical image (e.g., 104) depicting an anatomical structure (e.g., 106) of a medical patient; localize, via execution of a structure-specific segmentation model (e.g., 110) on the medical image, a first inferred boundary (e.g., 202) of the anatomical structure; and generate an uncertainty score (e.g., 602) for the first inferred boundary, based on a second inferred boundary (e.g., 406) of the anatomical structure generated via execution of a structure-agnostic segmentation model (e.g., 404) on the medical image.

In various instances, machine learning algorithms or models can be implemented in any suitable way to facilitate any suitable aspects described herein. To facilitate some of the above-described machine learning aspects of various embodiments, consider the following discussion of artificial intelligence (AI). Various embodiments described herein can employ artificial intelligence to facilitate automating one or more features or functionalities. The components can employ various AI-based schemes for carrying out various embodiments/examples disclosed herein. In order to provide for or aid in the numerous determinations (e.g., determine, ascertain, infer, calculate, predict, prognose, estimate, derive, forecast, detect, compute) described herein, components described herein can examine the entirety or a subset of the data to which it is granted access and can provide for reasoning about or determine states of the system or environment from a set of observations as captured via events or data. Determinations can be employed to identify a specific context or action, or can generate a probability distribution over states, for example. The determinations can be probabilistic; that is, the computation of a probability distribution over states of interest based on a consideration of data and events. Determinations can also refer to techniques employed for composing higher-level events from a set of events or data.

Such determinations can result in the construction of new events or actions from a set of observed events or stored event data, whether or not the events are correlated in close temporal proximity, and whether the events and data come from one or several event and data sources. Components disclosed herein can employ various classification (explicitly trained (e.g., via training data) as well as implicitly trained (e.g., via observing behavior, preferences, historical information, receiving extrinsic information, and so on)) schemes or systems (e.g., support vector machines, neural networks, expert systems, Bayesian belief networks, fuzzy logic, data fusion engines, and so on) in connection with performing automatic or determined action in connection with the claimed subject matter. Thus, classification schemes or systems can be used to automatically learn and perform a number of functions, actions, or determinations.

A classifier can map an input attribute vector, $z=(z_1, z_2, z_3, z_4, z_n)$, to a confidence that the input belongs to a class, as by $f(z)=confidence(class)$. Such classification can employ a probabilistic or statistical-based analysis (e.g., factoring into the analysis utilities and costs) to determinate an action to be automatically performed. A support vector machine (SVM) can be an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, or probabilistic classification models providing different patterns of independence, any of which can be employed. Classification as used herein also is inclusive of statistical regression that is utilized to develop models of priority.

Figure 18:
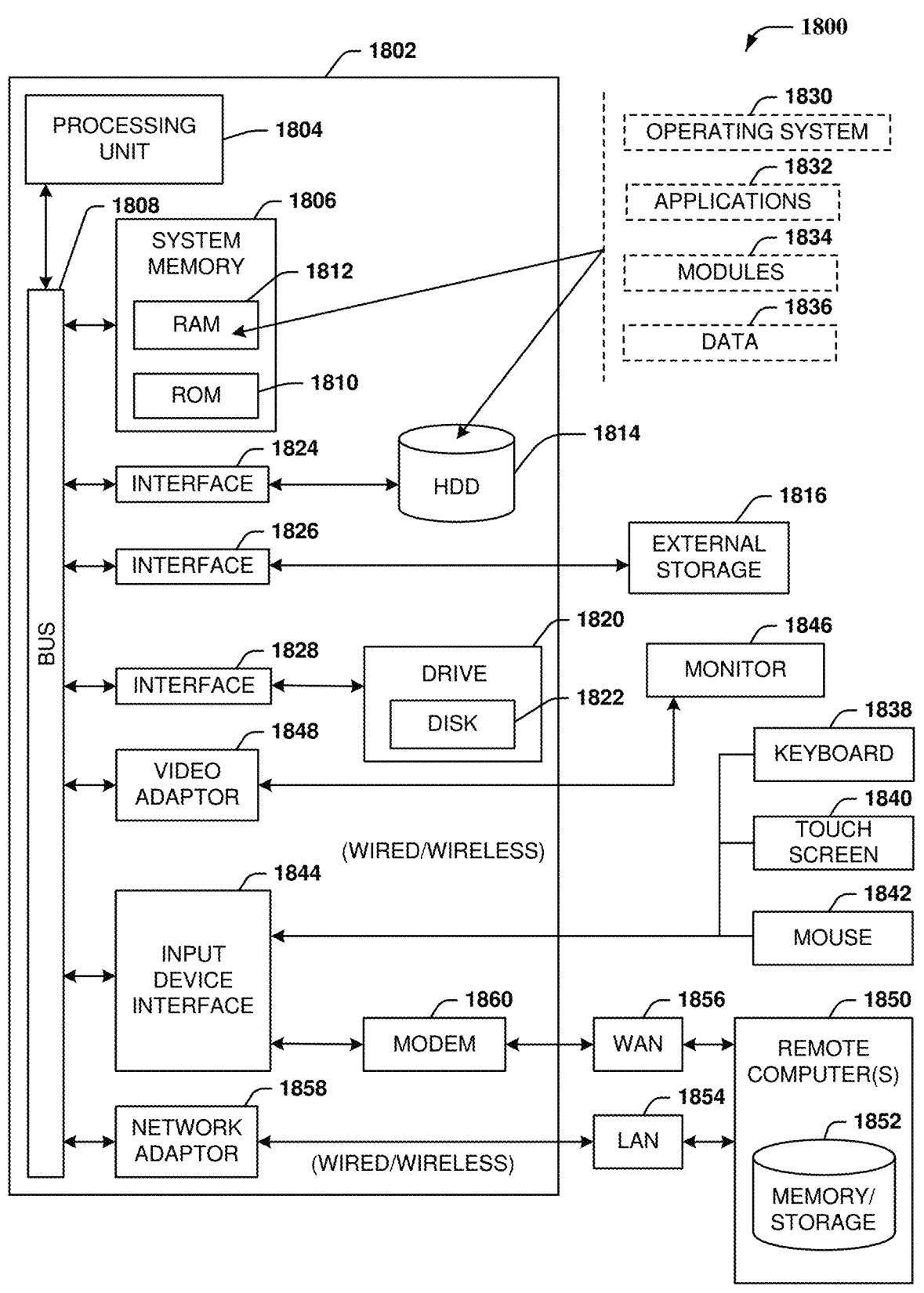
FIG. 18 illustrates a block diagram of an example, non-limiting operating environment in which one or more embodiments described herein can be facilitated.

In order to provide additional context for various embodiments described herein, FIG. 18 and the following discussion are intended to provide a brief, general description of a suitable computing environment 1800 in which the various embodiments of the embodiment described herein can be implemented. While the embodiments have been described above in the general context of computer-executable instructions that can run on one or more computers, those skilled in the art will recognize that the embodiments can be also implemented in combination with other program modules or as a combination of hardware and software.

Generally, program modules include routines, programs, components, data structures, etc., that perform particular tasks or implement particular abstract data types. Moreover, those skilled in the art will appreciate that various aspects can be practiced with other computer system configurations, including single-processor or multi-processor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 18, the example environment 1800 for implementing various embodiments of the aspects described herein includes a computer 1802, the computer 1802 including a processing unit 1804, a system memory 1806 and a system bus 1808. The system bus 1808 couples system components including, but not limited to, the system memory 1806 to the processing unit 1804. The processing unit 1804 can be any of various commercially available processors. Dual microprocessors and other multi-processor architectures can also be employed as the processing unit 1804.

The system bus 1808 can be any of several types of bus structure that can further interconnect to a memory bus (with or without a memory controller), a peripheral bus, and a local bus using any of a variety of commercially available bus architectures. The system memory 1806 includes ROM 1810 and RAM 1812. A basic input/output system (BIOS) can be stored in a non-volatile memory such as ROM, erasable programmable read only memory (EPROM), EEPROM, which BIOS contains the basic routines that help to transfer information between elements within the computer 1802, such as during startup. The RAM 1812 can also include a high-speed RAM such as static RAM for caching data.

The computer 1802 further includes an internal hard disk drive (HDD) 1814 (e.g., EIDE, SATA), one or more external storage devices 1816 (e.g., a magnetic floppy disk drive (FDD) 1816, a memory stick or flash drive reader, a memory card reader, etc.) and a drive 1820, e.g., such as a solid state drive, an optical disk drive, which can read or write from a disk 1822, such as a CD-ROM disc, a DVD, a BD, etc. Alternatively, where a solid state drive is involved, disk 1822 would not be included, unless separate. While the internal HDD 1814 is illustrated as located within the computer 1802, the internal HDD 1814 can also be configured for external use in a suitable chassis (not shown). Additionally, while not shown in environment 1800, a solid state drive (SSD) could be used in addition to, or in place of, an HDD 1814. The HDD 1814, external storage device(s) 1816 and drive 1820 can be connected to the system bus 1808 by an HDD interface 1824, an external storage interface 1826 and a drive interface 1828, respectively. The interface 1824 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1802, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1812, including an operating system 1830, one or more application programs 1832, other program modules 1834 and program data 1836. All or portions of the operating system, applications, modules, or data can also be cached in the RAM 1812. The systems and methods described herein can be implemented utilizing various commercially available operating systems or combinations of operating systems.

Computer 1802 can optionally comprise emulation technologies. For example, a hypervisor (not shown) or other intermediary can emulate a hardware environment for operating system 1830, and the emulated hardware can optionally be different from the hardware illustrated in FIG. 18. In such an embodiment, operating system 1830 can comprise one virtual machine (VM) of multiple VMs hosted at computer 1802. Furthermore, operating system 1830 can provide runtime environments, such as the Java runtime environment or the .NET framework, for applications 1832. Runtime environments are consistent execution environments that allow applications 1832 to run on any operating system that includes the runtime environment. Similarly, operating system 1830 can support containers, and applications 1832 can be in the form of containers, which are lightweight, standalone, executable packages of software that include, e.g., code, runtime, system tools, system libraries and settings for an application.

Further, computer 1802 can be enable with a security module, such as a trusted processing module (TPM). For instance with a TPM, boot components hash next in time boot components, and wait for a match of results to secured values, before loading a next boot component. This process can take place at any layer in the code execution stack of computer 1802, e.g., applied at the application execution level or at the operating system (OS) kernel level, thereby enabling security at any level of code execution.

A user can enter commands and information into the computer 1802 through one or more wired/wireless input devices, e.g., a keyboard 1838, a touch screen 1840, and a pointing device, such as a mouse 1842. Other input devices (not shown) can include a microphone, an infrared (IR) remote control, a radio frequency (RF) remote control, or other remote control, a joystick, a virtual reality controller or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1804 through an input device interface 1844 that can be coupled to the system bus 1808, but can be connected by other interfaces, such as a parallel port, an IEEE 1394 serial port, a game port, a USB port, an IR interface, a BLUETOOTH® interface, etc.

A monitor 1846 or other type of display device can be also connected to the system bus 1808 via an interface, such as a video adapter 1848. In addition to the monitor 1846, a computer typically includes other peripheral output devices (not shown), such as speakers, printers, etc.

The computer 1802 can operate in a networked environment using logical connections via wired or wireless communications to one or more remote computers, such as a remote computer(s) 1850. The remote computer(s) 1850 can be a workstation, a server computer, a router, a personal computer, portable computer, microprocessor-based entertainment appliance, a peer device or other common network node, and typically includes many or all of the elements described relative to the computer 1802, although, for purposes of brevity, only a memory/storage device 1852 is illustrated. The logical connections depicted include wired/wireless connectivity to a local area network (LAN) 1854 or larger networks, e.g., a wide area network (WAN) 1856. Such LAN and WAN networking environments are commonplace in offices and companies, and facilitate enterprise-wide computer networks, such as intranets, all of which can connect to a global communications network, e.g., the Internet.

When used in a LAN networking environment, the computer 1802 can be connected to the local network 1854 through a wired or wireless communication network interface or adapter 1858. The adapter 1858 can facilitate wired or wireless communication to the LAN 1854, which can also include a wireless access point (AP) disposed thereon for communicating with the adapter 1858 in a wireless mode.

When used in a WAN networking environment, the computer 1802 can include a modem 1860 or can be connected to a communications server on the WAN 1856 via other means for establishing communications over the WAN 1856, such as by way of the Internet. The modem 1860, which can be internal or external and a wired or wireless device, can be connected to the system bus 1808 via the input device interface 1844. In a networked environment, program modules depicted relative to the computer 1802 or portions thereof, can be stored in the remote memory/storage device 1852. It will be appreciated that the network connections shown are example and other means of establishing a communications link between the computers can be used.

When used in either a LAN or WAN networking environment, the computer 1802 can access cloud storage systems or other network-based storage systems in addition to, or in place of, external storage devices 1816 as described above, such as but not limited to a network virtual machine providing one or more aspects of storage or processing of information. Generally, a connection between the computer 1802 and a cloud storage system can be established over a LAN 1854 or WAN 1856 e.g., by the adapter 1858 or modem 1860, respectively. Upon connecting the computer 1802 to an associated cloud storage system, the external storage interface 1826 can, with the aid of the adapter 1858 or modem 1860, manage storage provided by the cloud storage system as it would other types of external storage. For instance, the external storage interface 1826 can be configured to provide access to cloud storage sources as if those sources were physically connected to the computer 1802.

The computer 1802 can be operable to communicate with any wireless devices or entities operatively disposed in wireless communication, e.g., a printer, scanner, desktop or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

FIG. 19 is a schematic block diagram of a sample computing environment 1900 with which the disclosed subject matter can interact. The sample computing environment 1900 includes one or more client(s) 1910. The client(s) 1910 can be hardware or software (e.g., threads, processes, computing devices). The sample computing environment 1900 also includes one or more server(s) 1930. The server(s) 1930 can also be hardware or software (e.g., threads, processes, computing devices). The servers 1930 can house threads to perform transformations by employing one or more embodiments as described herein, for example. One possible communication between a client 1910 and a server 1930 can be in the form of a data packet adapted to be transmitted between two or more computer processes. The sample computing environment 1900 includes a communication framework 1950 that can be employed to facilitate communications between the client(s) 1910 and the server(s) 1930. The client(s) 1910 are operably connected to one or more client data store(s) 1920 that can be employed to store information local to the client(s) 1910. Similarly, the server (s) 1930 are operably connected to one or more server data store(s) 1940 that can be employed to store information local to the servers 1930.

Various embodiments may be a system, a method, an apparatus or a computer program product at any possible technical detail level of integration. The computer program product can include a computer readable storage medium (or media) having computer readable program instructions thereon for causing a processor to carry out aspects of various embodiments. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network or a wireless network. The network can comprise copper transmission cables, optical transmission fibers, wireless transmission, routers, firewalls, switches, gateway computers or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of various embodiments can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform various aspects.

Various aspects are described herein with reference to flowchart illustrations or block diagrams of methods, apparatus (systems), and computer program products according to various embodiments. It will be understood that each block of the flowchart illustrations or block diagrams, and combinations of blocks in the flowchart illustrations or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart or block diagram block or blocks. These computer readable program instructions can also be stored in a computer readable storage medium that can direct a computer, a programmable data processing apparatus, or other devices to function in a particular manner, such that the computer readable storage medium having instructions stored therein comprises an article of manufacture including instructions which implement aspects of the function/act specified in the flowchart or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart or block diagram block or blocks.

The flowcharts and block diagrams in the Figures illustrate the architecture, functionality, and operation of possible implementations of systems, methods, and computer program products according to various embodiments. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer or computers, those skilled in the art will recognize that this disclosure also can or can be implemented in combination with other program modules. Generally, program modules include routines, programs, components, data structures, etc. that perform particular tasks or implement particular abstract data types. Moreover, those skilled in the art will appreciate that various aspects can be practiced with other computer system configurations, including single-processor or multi-processor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, or a computer. By way of illustration, both an application running on a server and the server can be a component. One or more components can reside within a process or thread of execution and a component can be localized on one computer or distributed between two or more computers. In another example, respective components can execute from various computer readable media having various data structures stored thereon. The components can communicate via local or remote processes such as in accordance with a signal having one or more data packets (e.g., data from one component interacting with another component in a local system, distributed system, or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. As used herein, the term "and/or" is intended to have the same meaning as "or." Moreover, articles "a" and "an" as used in the subject specification and annexed drawings should generally be construed to mean "one or more" unless specified otherwise or clear from context to be directed to a singular form. As used herein, the terms "example" or "exemplary" are utilized to mean serving as an example, instance, or illustration. For the avoidance of doubt, the subject matter disclosed herein is not limited by such examples. In addition, any aspect or design described herein as an "example" or "exemplary" is not necessarily to be construed as preferred or advantageous over other aspects or designs, nor is it meant to preclude equivalent exemplary structures and techniques known to those of ordinary skill in the art.

The herein disclosure describes non-limiting examples. For case of description or explanation, various portions of the herein disclosure utilize the term "each," "every," or "all" when discussing various examples. Such usages of the term "each," "every," or "all" are non-limiting. In other words, when the herein disclosure provides a description that is applied to "each," "every," or "all" of some particular object or component, it should be understood that this is a non-limiting example, and it should be further understood that, in various other examples, it can be the case that such description applies to fewer than "each," "every," or "all" of that particular object or component.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:

a memory configured to store computer-executable components; and a processor that executes at least one of the computer-executable components that:

accesses an image depicting an object classified in an object class of a group of object classes;

localizes, using an object-specific segmentation model, a first inferred boundary of the object in the image, wherein the object-specific segmentation model has been previously trained to infer boundaries of objects in a subgroup of object classes of the group of object classes, wherein the subgroup of object classes comprises the object class, wherein the subgroup is less than all of the group, and wherein the object-specific segmentation model has not been previously trained to infer boundaries of objects that are not in the subgroup of object classes; and generates an uncertainty score for the first inferred boundary, based on a second inferred boundary of the object generated via execution of an object-agnostic segmentation model on the image, wherein the object-agnostic segmentation model has been previously trained to infer boundaries of any objects without regard to classification of the objects into any object classes.

2. The system of claim 1, wherein the object-agnostic segmentation model comprises a click-based segmentation model, and wherein the at least one of the computer-executable components further:

receives or generates a set of positive clicks inside the object and a set of negative clicks outside the object; and localizes, using the object-agnostic segmentation model, the second inferred boundary in the image based on the set of positive clicks and the set of negative clicks.

3. The system of claim 1, wherein the object-agnostic segmentation model comprises a bounding-box-based segmentation model, and wherein the at least one of the computer-executable components further:

receives or generates a bounding box circumscribing the object; and localizes, using the object-agnostic segmentation model, the second inferred boundary in the image based on the bounding box.

4. The system of claim 1, wherein the object-agnostic segmentation model comprises a text-prompt-based segmentation model, and wherein the at least one of the computer-executable components further comprise:

receives, from a user, a text prompt describing the object; and localizes, using the object-agnostic segmentation model, the second inferred boundary in the image based on the text prompt.

5. The system of claim 1, wherein the object-agnostic segmentation model localizes multiple inferred boundaries of multiple objects depicted in the image, and wherein the second inferred boundary is whichever of the multiple inferred boundaries is closest to the first inferred boundary.

6. The system of claim 1, wherein the at least one of the computer-executable components further:

visually renders, on an electronic display, at least one of:

both the first inferred boundary and the second inferred boundary; or one or more non-overlap regions between the first inferred boundary and the second inferred boundary.

7. The system of claim 1, wherein the image is of a medical patient, wherein the image is an X-ray image, a computed tomography image, a magnetic resonance image, an ultrasound image, or a positron emission tomography image, and wherein the object is an anatomical structure of the medical patient.

8. A computer-implemented method, comprising:

accessing, by a system operatively coupled to a processor, an image depicting an object classified in an object class of a group of object classes;

localizing, by the system, using an object-specific segmentation model, a first inferred boundary of the object in the image, wherein the object-specific segmentation model has been previously trained to infer boundaries of objects in a subgroup of object classes of the group of object classes, wherein the subgroup of object classes comprises the object class, wherein the subgroup is less than all of the group, and wherein the object-specific segmentation model has not been previously trained to infer boundaries of objects that are not in the subgroup of object classes; and generating, by the system, an uncertainty score for the first inferred boundary, based on a second inferred boundary of the object generated via execution of an object-agnostic segmentation model on the image, wherein the object-agnostic segmentation model has been previously trained to infer boundaries of any objects without regard to classification of the objects into any object classes.

9. The computer-implemented method of claim 8, wherein the object-agnostic segmentation model comprises a click-based segmentation model, and further comprising:

receiving or generating, by the system, a set of positive clicks inside the object and a set of negative clicks outside the object; and localizing, by the system, using the object-agnostic segmentation model the second inferred boundary in the image based on the set of positive clicks and the set of negative clicks.

10. The computer-implemented method of claim 8, wherein the object-agnostic segmentation model comprises a bounding-box-based segmentation model, and further comprising:

receiving or generating, by the system, a bounding box circumscribing the object; and localizing, by the system, using the object-agnostic segmentation model the second inferred boundary in the image based on the bounding box.

11. The computer-implemented method of claim 8, wherein the object-agnostic segmentation model comprises a text-prompt-based segmentation model, and further comprising:

receiving, by the system, from a user, a text prompt describing the object; and localizing, by the system, using the object-agnostic segmentation model the second inferred boundary in the image based on the text prompt.

12. The computer-implemented method of claim 8, wherein the object-agnostic segmentation model localizes multiple inferred boundaries of multiple objects depicted in the image, and wherein the second inferred boundary is whichever of the multiple inferred boundaries is closest to the first inferred boundary.

13. The computer-implemented method of claim 8, further comprising:

visually rendering, by the system, on an electronic display, at least one of:

both the first inferred boundary and the second inferred boundary; or one or more non-overlap regions between the first inferred boundary and the second inferred boundary.

14. The computer-implemented method of claim 8, wherein the image is of a medical patient, wherein the image is an X-ray image, a computed tomography image, a magnetic resonance image, an ultrasound image, or a positron emission tomography image, and wherein the object is an anatomical structure of the medical patient.

15. A computer program product for facilitating improved uncertainty estimation via object-specific and object-agnostic segmentation disagreement, the computer program product comprising a computer-readable memory having program instructions embodied therewith, the program instructions executable by a processor to cause the processor to:

access a medical image depicting an anatomical structure of a medical patient, wherein the anatomical structure is classified in a structure class of a group of structure classes;

localize, using a structure-specific segmentation model, a first inferred boundary of the anatomical structure in the medical image, wherein the structure-specific segmentation model has been previously trained to infer boundaries of anatomical structures in a subgroup of structure classes of the group of structure classes, wherein the subgroup of structure classes comprises the structure class, wherein the subgroup is less than all of the group, and wherein the object-specific segmentation model has not been previously trained to infer boundaries of objects that are not in the subgroup of object classes;

generate an uncertainty score for the first inferred boundary, based on a second inferred boundary of the anatomical structure generated via execution of a structure-agnostic segmentation model on the medical image, wherein the structure-agnostic segmentation model has been previously trained to infer boundaries of any structures without regard to classification of the structures into any structure classes; and recommend or perform, in response to the uncertainty score failing to satisfy a threshold, retraining of the structure-specific segmentation model.

16. The computer program product of claim 15, wherein the structure-agnostic segmentation model comprises a click-based segmentation model, and wherein the program instructions are further executable to cause the processor to:

receive or generate a set of positive clicks inside the anatomical structure and a set of negative clicks outside the anatomical structure; and localize, using the structure-agnostic segmentation model, the second inferred boundary in the medical image based on the set of positive clicks and the set of negative clicks.

17. The computer program product of claim 15, wherein the structure-agnostic segmentation model comprises a bounding-box-based segmentation model, and wherein the program instructions are further executable to cause the processor to:

receive or generate a bounding box circumscribing the anatomical structure; and localize, using the structure-agnostic segmentation model, the second inferred boundary in the medical image based on the bounding box.

18. The computer program product of claim 15, wherein the structure-agnostic segmentation model comprises a text-prompt-based segmentation model, and wherein the program instructions are further executable to cause the processor to:

receive, from a user, a text prompt describing the anatomical structure; and localize, using the structure-agnostic segmentation model, the second inferred boundary in the medical image based on the text prompt.

19. The computer program product of claim 15, wherein the structure-agnostic segmentation model localizes multiple inferred boundaries of multiple objects depicted in the medical image, and wherein the second inferred boundary is whichever of the multiple inferred boundaries is closest to the first inferred boundary.

20. The computer program product of claim 15, wherein the program instructions are further executable to cause the processor to:

visually render, on an electronic display, at least one of:

both the first inferred boundary and the second inferred boundary; or one or more non-overlap regions between the first inferred boundary and the second inferred boundary.

* * * * *